United States Patent
Ma et al.

(10) Patent No.: US 12,341,606 B2
(45) Date of Patent: Jun. 24, 2025

(54) METHODS AND SYSTEMS FOR NETWORK CODING USING CROSS-PACKET CHECK BLOCKS

(71) Applicants: Jianglei Ma, Ottawa (CA); Ming Jia, Ottawa (CA); Yu Cao, Ottawa (CA); Peiying Zhu, Kanata (CA); Wen Tong, Ottawa (CA)

(72) Inventors: Jianglei Ma, Ottawa (CA); Ming Jia, Ottawa (CA); Yu Cao, Ottawa (CA); Peiying Zhu, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 505 days.

(21) Appl. No.: 17/110,226

(22) Filed: Dec. 2, 2020

(65) Prior Publication Data
US 2021/0297180 A1    Sep. 23, 2021

Related U.S. Application Data

(60) Provisional application No. 62/992,799, filed on Mar. 20, 2020.

(51) Int. Cl.
*H04L 1/00* (2006.01)
*H04L 1/1812* (2023.01)

(52) U.S. Cl.
CPC .......... *H04L 1/0057* (2013.01); *H04L 1/0041* (2013.01); *H04L 1/0045* (2013.01); *H04L 1/1812* (2013.01); *H04L 2001/0097* (2013.01)

(58) Field of Classification Search
CPC ... H04L 1/0077; H04L 1/1819; H04L 1/0045; H04L 1/1812; H04L 1/0057; H04L 1/0041; H04L 1/0066; H04L 2001/0097
See application file for complete search history.

(56) References Cited

U.S. PATENT DOCUMENTS

| | | | |
|---|---|---|---|
| 9,184,871 B2* | 11/2015 | Kim | ............... H04L 1/0061 |
| 2007/0217432 A1 | 9/2007 | Molisch et al. | |
| 2007/0253423 A1 | 11/2007 | Chindapol et al. | |
| 2009/0327842 A1 | 12/2009 | Liu et al. | |
| 2011/0099446 A1* | 4/2011 | Murakami | ............ H04L 1/1825 |
| | | | 714/E11.131 |
| 2014/0331102 A1* | 11/2014 | Lee | ............... H03M 13/2906 |
| | | | 714/758 |
| 2016/0143076 A1* | 5/2016 | Razavi | .................. H04L 67/288 |
| | | | 370/329 |
| 2017/0041100 A1 | 2/2017 | Xie et al. | |
| 2017/0170925 A1* | 6/2017 | Xu | ............... H04L 1/0065 |
| 2018/0109355 A1* | 4/2018 | Werner | .............. H04L 1/0089 |

(Continued)

FOREIGN PATENT DOCUMENTS

| | | |
|---|---|---|
| CN | 105335247 A | 2/2016 |
| CN | 107844272 A | 3/2018 |

*Primary Examiner* — Oussama Roudani

(57) ABSTRACT

Methods and systems for physical layer network coding based on two-dimensional (2D) joint coding are described. In some methods, first and second packets are obtained. A set of one or more cross-packet check blocks is generated, where each cross-packet check block is generated based on a set of cross-packet bits including at least one bit from each of the first and second packets. At least one cross-packet check block is transmitted to a first communication node.

21 Claims, 21 Drawing Sheets

(56) References Cited

U.S. PATENT DOCUMENTS

| | | |
|---|---|---|
| 2019/0319749 A1 | 10/2019 | Cao et al. |
| 2020/0228247 A1* | 7/2020 | Guo ..................... H04L 1/0025 |
| 2020/0235759 A1* | 7/2020 | Ye ..................... H03M 13/6306 |
| 2021/0007006 A1* | 1/2021 | Chen ..................... H04L 1/1887 |
| 2021/0250120 A1* | 8/2021 | Pirskanen ............. H04L 69/323 |

* cited by examiner

METHODS AND SYSTEMS FOR NETWORK CODING USING CROSS-PACKET CHECK BLOCKS

CROSS-REFERENCE TO RELATED APPLICATIONS

The present application claims priority from U.S. provisional patent application No. 62/992,799, entitled "METHODS AND SYSTEMS FOR NETWORK CODING USING CROSS-PACKET CHECK BLOCKS", filed Mar. 20, 2020, the entirety of which is hereby incorporated by reference.

FIELD

The present disclosure relates to wireless communications, including the use of network coding in wireless communications.

BACKGROUND

Hybrid automatic repeat request (H-ARQ or HARQ) is a common feature of wireless physical-layer retransmission. The original concept was called incremental redundancy (IR) based retransmission, which transmits additional bits of an untransmitted mother-code when an original transmission fails. In other words, a mother-code is stored in a circular buffer, and after an initial code block containing bits from the mother-code is transmitted, as part of the HARQ process, the transmitter transmits new IR bits from the circular buffer. The new IR bits together with the previously transmitted data form a new code block. This is repeated until a maximum number of retransmissions is reached or a code block is successfully decoded.

In Long Term Evolution (LTE) mobile broadband (MBB) transmission, a transport block (TB) is often divided into multiple code blocks (CBs) for transmission. Each CB has its own parity bits, and the combined TB also has an overall parity block. In LTE Release-8, when one or more CB is in error, a retransmission request is sent back to the transmitter. Since the transmitter does not know which CB is in error, the transmitter retransmits all the CBs in the TB, with additional incremental parity bits (a form of IR bits), until the maximum number of retransmissions is reached or the TB is successfully received.

When not all code blocks are in error, retransmitting IR bits for all code blocks will result in efficiency loss, because retransmitting IR bits to the code blocks that have been correctly decoded will not provide any help for the code blocks in error. In another approach (e.g., for New Radio (NR) wireless technology), code blocks are grouped into code block groups (CBGs), and feedback is transmitted on a per-CBG basis by transmitting the index of a CBG containing a CB in error, and the entire CBG is retransmitted in response to the feedback. A disadvantage of a CBG based approach is that index feedback can be inefficient. For example, in the case when each CBG has one CB in error, the receiver still needs to feed back the indices of all the CBGs, and all CBs are retransmitted such that no retransmission is saved.

In another approach, an outer code is used. Outer codes are essentially erasure codes. The main benefit of outer codes is that there is no need to know which CBs have failed transmission. Outer codes are more effective when the number of failed CBs is small. Examples include parity-check and Reed-Solomon codes.

Accordingly, it would be useful to provide more efficient parity check and retransmission techniques.

SUMMARY

In various examples, the present disclosure describes methods and apparatuses for physical (PHY) layer network coding based on two-dimensional (2D) joint coding. The disclosed examples may be applicable for ultra-reliable low-latency communications (URLLC), among other applications. For example, the disclosed examples may also be applicable for multi-link (or multi-node) communications, multi-hop communications (i.e., where an intermediate node between a transmitting node and a receiving node may act as a relay), and multi-user equipment (UE) cooperative communications.

In some examples, the present disclosure may address a problem of how to enable communications with extreme low latency and extreme high reliability and/or a problem of how to support improved performance of physical layer multi-path/multi-hop/multi-source/multi-destination/multi-packets data transmission.

In some examples, the present disclosure describes a method at a first communication node. The method includes: obtaining a first packet and a second packet; generating a set of one or more cross-packet check blocks, each cross-packet check block being generated based on a set of cross-packet bits including at least one bit from each of the first and second packets; transmitting at least one cross-packet check block to a second communication node; and transmitting at least one of the first and second packets to the second communication node or a third communication node.

In any of the above examples, at least one of the first communication node, the second communication node, or the third communication node is an intermediate node between a source node of at least one of the first and second packets and a destination node of at least one of the first and second packets.

In any of the above examples, the first packet and the second packet may be obtained from different source nodes.

In any of the above examples, the first packet and the second packet may be obtained from a same source node.

In any of the above examples, the first packet and the second packet may be intended for different destination nodes.

In any of the above examples, the first packet and the second packet may be intended for a same destination node.

In any of the above examples, transmitting the at least one cross-packet check block and transmitting the at least one of the first and second packets may be performed in different time slots.

In any of the above examples, transmitting the at least one cross-packet check block and transmitting the at least one of the first and second packets may be performed in a same time slot.

In any of the above examples, the at least one cross-packet check block and the at least one of the first and second packets may be transmitted to the second communication node.

In any of the above examples, the at least one cross-packet check block may be transmitted to the second communication node and the at least one of the first and second packets may be transmitted to the third communication node.

In any of the above examples, the first communication node may be a first intermediate node and the second or the third communication node may be a second intermediate node, and the first and the second intermediate nodes may be along a communication path between the source node and the destination node.

In any of the above examples, the first communication node may be a first intermediate node and the second communication node may be a second intermediate node, and the at least one cross-packet check block may be transmitted over a sidelink interface.

In any of the above examples, the first communication node may be a first intermediate node, and at least one of the first and second packets may be transmitted over a sidelink interface to the second or third communication node that may be another intermediate node.

In any of the above examples, the first communication node may be the source node of at least one of the first packet and the second packet, and the second or third communication node may be the intermediate node.

In any of the above examples, the first communication node may be the intermediate node, and the second or third communication node may be the destination node.

In some examples, the present disclosure describes a method at a first communication node. The method includes: receiving a first packet from a second communication node; receiving, from the second or third communication node, information for decoding the first packet; receiving, from the second communication node, the third communication node or a fourth communication node, a first set of one or more cross-packet check blocks, each cross-packet check block in the first set being generated based on a first set of cross-packet bits including at least one bit from each of the first packet and at least a second packet; and decoding the first packet, wherein the first set of one or more cross-packet check blocks is used during the decoding. At least one of the first communication node, the second communication node, or the third communication node is an intermediate node between a source node of the first packet and a destination node of the first packet.

In any of the above examples, the first communication node may be the intermediate node, and the method may include: transmitting the decoded first packet to the destination node.

In any of the above examples, the first packet and the first set of one or more cross-packet check blocks may be received in different time slots or a same time slot.

In any of the above examples, the first packet, the first set of one or more cross-packet check blocks, or the information for decoding the first packet may be received over a sidelink interface.

In some examples, the present disclosure describes an apparatus including a processing unit. The processing unit is configured to execute machine-readable instructions to cause the apparatus to perform any of the methods described above.

In some examples, the present disclosure describes a computer readable medium having machine-executable instructions stored thereon. The instructions, when executed by a processing unit of an apparatus, cause the apparatus to perform the any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

To assist in understanding the present disclosure, an example wireless communication system is first described.

Figure 1:
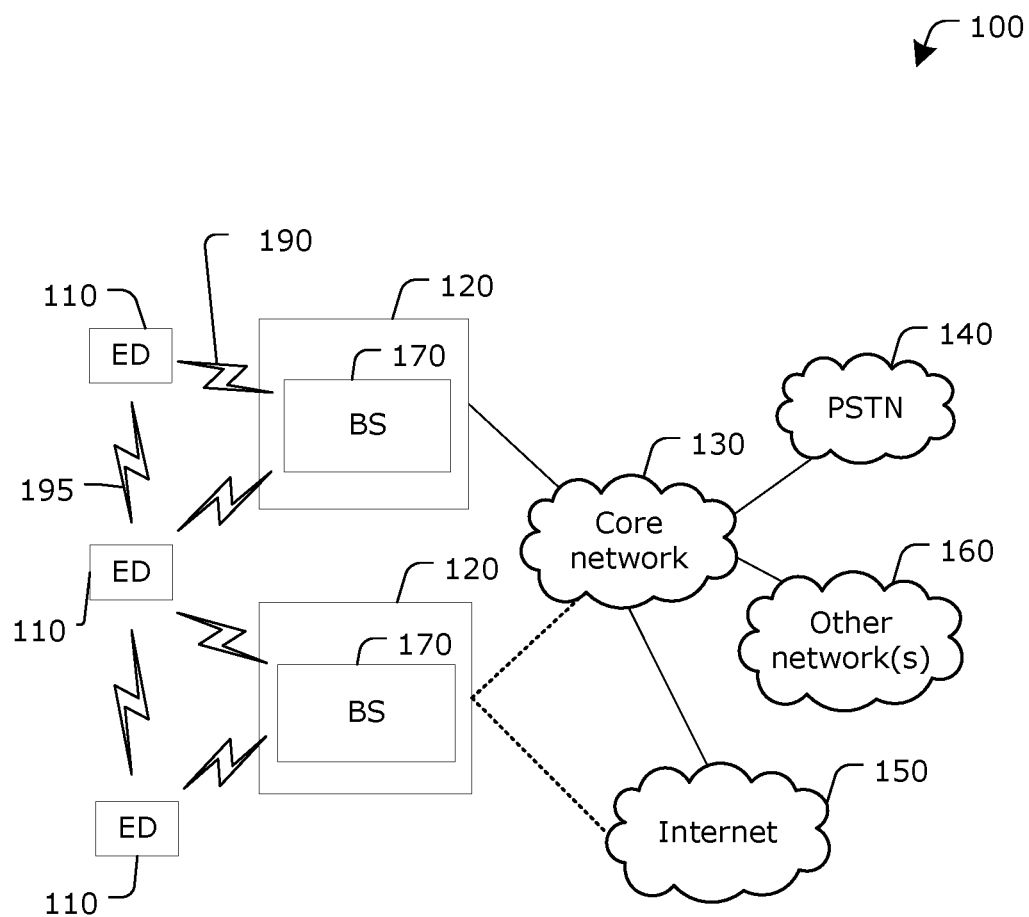
FIG. 1 is a schematic diagram of an example communication system suitable for implementing examples described herein.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology. In some examples, the wireless system 100 may also accommodate some legacy wireless technology (e.g., 3G or 4G wireless technology).

In the example shown, the wireless system 100 includes electronic devices (EDs) 110, radio access networks (RANs) 120, a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment (UE), a wireless transmit/receive unit (WTRU), a mobile station, a mobile relay, a fixed or mobile subscriber unit, a cellular telephone, a station (STA), a machine type communication (MTC) device, a personal digital assistant (PDA), a smartphone, a laptop, a computer, a tablet, a wireless sensor, an internet of things (IoT) device, or a consumer electronics device, among other possibilities. Future generation EDs 110 may be referred to using other terms. In some instances, an ED 110 may be or may be included in a network-enabled vehicle.

In FIG. 1, the RANs 120 include base stations (BSs) 170. Although FIG. 1 shows each RAN 120 including a single respective BS 170, it should be understood that any given RAN 120 may include more than one BS 170, and any given RAN 120 may also include base station controller(s) (BSC), radio network controller(s) (RNC), relay nodes, elements, and/or devices. Each BS 170 is configured to wirelessly interface with one or more of the EDs 110 to enable access to any other BS 170, the core network 130, the PSTN 140, the internet 150, and/or the other networks 160. For example, the BSs 170 may also be referred to as (or include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. In some examples, a BS 170 may access the core network 130 via the internet 150.

The EDs 110 and BSs 170 are examples of communication equipment that can be used to implement some or all of the functionality and/or embodiments described herein. Any BS 170 may be a single element, as shown, or multiple elements, distributed in the corresponding RAN 120, or otherwise. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more uplink (UL) wireless interfaces 190 (e.g., via radio frequency (RF), microwave, infrared (IR), etc.). The UL interface 190 may also be referred to as a UL connection, ED-BS link/connection/interface, or ED-network link/connection/interface, for example. The EDs 110 may also communicate directly with one another (i.e., without involving the BS 170) via one or more sidelink (SL) wireless interfaces 195. The SL interface 195 may also be referred to as a SL connection, UE-to-UE link/connection/interface, vehicle-to-vehicle (V2V) or vehicle-to-everything (V2X) link/connection/interface, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). The internet 150 may include a network of computers and subnets (intranets) or both, and incorporate protocols, such as Internet Protocol (IP), Transmission Control Protocol (TCP), User Datagram Protocol (UDP). The EDs 110 may be multimode devices capable of operation according to multiple radio access technologies, and incorporate multiple transceivers necessary to support such.

Figure 2:
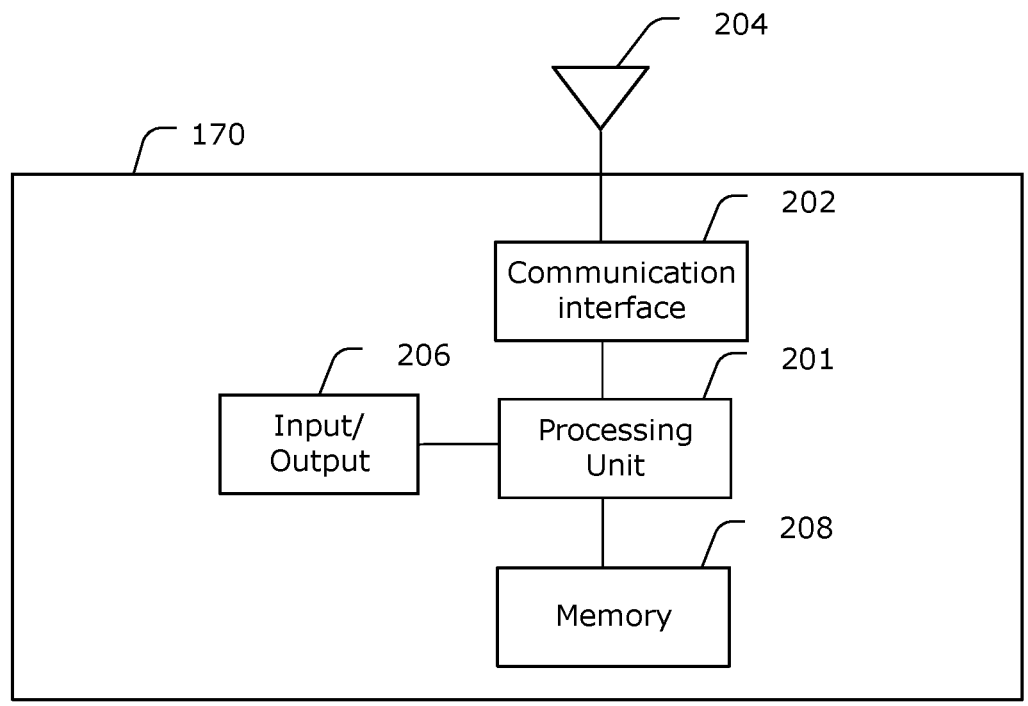
FIGS. 2 and 3 are block diagrams showing an example base station (BS) and an example electronic device (ED), respectively, suitable for implementing examples described herein.
Figure 3:
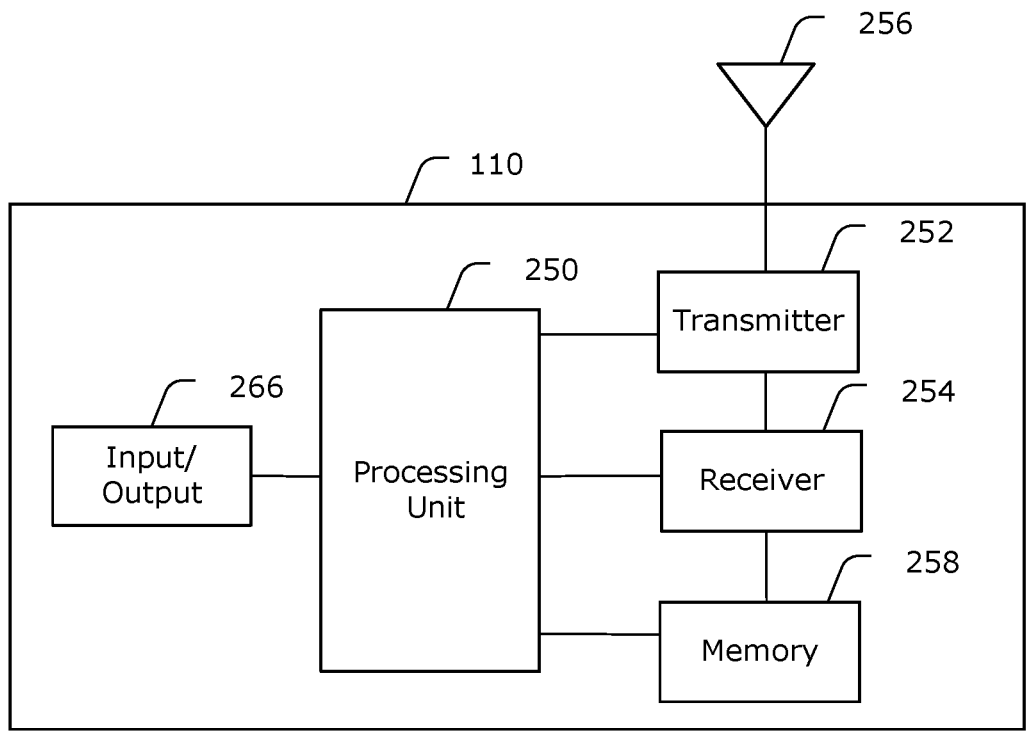

FIGS. 2 and 3 illustrate example devices that may implement the methods and teachings according to this disclosure. FIG. 2 illustrates an example BS 170, and FIG. 3 illustrates an example ED 110. These components could be used in the wireless system 100 or in any other suitable system.

As shown in FIG. 2, the BS 170 includes at least one processing unit 201. The processing unit 201 implements various processing operations of the BS 170. For example, the processing unit 201 could perform signal coding, data processing, power control, input/output processing, or any other functionality of the BS 170. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The BS 170 also includes at least one communication interface 202 for wired and/or wireless communications. Each communication interface 202 includes any suitable structure for generating signals for wireless or wired transmission and/or processing signals received wirelessly or by wire. The BS 170 in this example includes at least one antenna 204 (in other examples, the antenna 204 may be omitted). Each antenna 204 includes any suitable structure for transmitting and/or receiving wireless or wired signals. One or multiple communication interfaces 202 could be used in the BS 170. One or multiple antennas 204 could be used in the BS 170. In some examples, one or more antennas 204 may be an antenna array 204, which may be used to perform beamforming and beam steering operations. Although shown as a single functional unit, a BS 170 could also be implemented using at least one transmitter interface and at least one separate receiver interface.

The BS 170 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the BS 170 includes at least one memory 208. The memory 208 stores instructions and data used, generated, or collected by the BS 170. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the ED 110 includes at least one processing unit 250, at least one transmitter 252, at least one receiver 254, one or more antennas 256, at least one memory 258, and one or more input/output devices or interfaces 266. The processing unit 250 implements various processing operations of the ED 110, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the ED 110. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Techniques for joint encoding of multiple code blocks (CBs) in a single transport block (TB) have been discussed, including the generation of vertical check blocks, have been described in U.S. patent application Ser. No. 16/665,121, entitled "SYSTEM AND METHOD FOR HYBRID-ARQ", filed Oct. 28, 2019, the entirety of which is hereby incorporated by reference.

Figure 4:
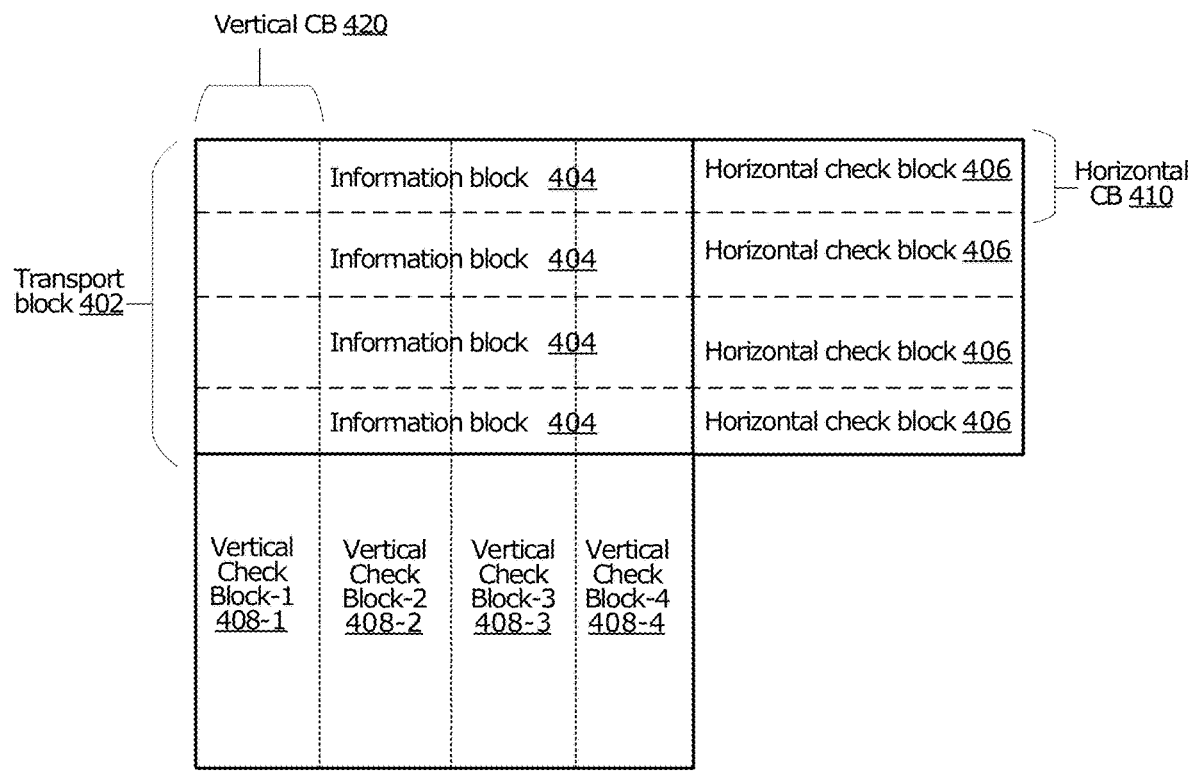
FIG. 4 illustrates an example code structure for a single transport block (TB), including horizontal check blocks and vertical check blocks.

FIG. 4 illustrates an example code structure for a single TB, including horizontal check blocks and vertical check blocks. The TB 402 includes multiple information blocks 404 formed from encoder input bits (in this example, four information blocks 404 are shown for simplicity, however this is not intended to be limiting). The bits in this example are arranged in L rows and K columns. The code structure also includes horizontal check blocks 406 (in this example, one horizontal check block 406 for each information block 404), and vertical check blocks 1-4 408-1 to 408-4 (generally referred to as vertical check block(s) 408). In this example, four vertical check blocks 408 are shown for simplicity, however this is not intended to be limiting. The number of vertical check blocks 408 to be used may be based on configuration at the transmitter (e.g., the BS 170 for downlink (DL) transmissions, or the ED 110 for uplink (UL) transmissions) and/or defined by a standard. Further, the number of vertical check blocks 408 may or may not be equal to the number of horizontal check blocks 406. Each row in the code contains $n_1$ bits, including $k_1$ encoder input bits (in one information block 404) and a respective horizontal check block 408 containing $n_1-k_1$ check bits. In the present disclosure, check bits may also be referred to as redundancy bits, or in some examples (e.g., in the case of systematic code) referred to as parity bits.

Each information block 404 and corresponding horizontal check block 406 may be viewed as an $n_1$ bit horizontal CB, with the TB 402 having multiple horizontal CBs. In the example of FIG. 4, the horizontal CBs are systematic CBs in that they each include systematic bits (in the information block 404) and check bits (in the horizontal check block 406) determined from the systematic bits. In other examples (discussed further below), the horizontal CBs 410 may be non-systematic.

The columns of encoder input bits may be considered as vertical CBS 420 each containing $n_2$ bits. One vertical CB 420 includes $k_2$ encoder input bits across multiple information blocks 404 (also referred to as cross-information block bits or simply cross-block bits) and a respective vertical check block 408 containing $n_2-k_2$ check bits (determined from the $k_2$ cross-block bits). The $k_2$ cross-block bits include M encoder input bits from each of the L horizontal CBs 410, where M≥1, such that $k_2=M\times L$. In other words, the $k_2$ cross-block bits include the bits from one of the K columns, and each column is M bits wide. In some examples, $k_2$ cross-block bits may include different numbers of information bits taken from each horizontal CB 410. This may be expressed mathematically as: $k_2=M_1+\ldots+M_L$, where $M_i$ is the number of information bits taken from each of the L horizontal CBs 410, $M_i>0$ and there is no requirement for $M_p=M_q$, when $p\neq q$.

The bits of a set of M×L cross-block bits and the bits of a corresponding vertical check block 408 containing $n_2-k_2$ check bits may be viewed as a vertical CB 420, such that the code structure contains multiple vertical CBS 420. In the example of FIG. 4, the vertical CBs 420 are systematic CBs in the sense that they each contain a first section (the cross-block bits, which contain encoder input bits across multiple information blocks 404) and a second section containing check bits (in the vertical check block 408) determined from the first section.

In the present disclosure, reference is made to "horizontal" (as in horizontal CB 410 and horizontal check block 406) and to "vertical" (as in vertical CB 420 and vertical check block 408). These terms are used for convenience in understanding the layout in some of the Figures, and to distinguish the two types of CBs and check blocks from each other. However, these terms are not meant to imply any physical structure. More generally, the descriptors "horizontal" and "vertical" may be equally replaced with "first" and "second", respectively. For example, the horizontal and vertical CBs 410, 420 can simply be referred to as first and second CBs, where each second CB includes bits taken from all of the first CBs. In examples shown, the systematic bits of each second systematic CB include at least one bit from each of the first CB. The check bits of each second systematic CB are determined from the systematic bits of the respective second CB (these check bits are referred to as the vertical check block 408 in FIG. 4). For ease of understanding, the present disclosure will use the terms "horizontal" and "vertical" instead of "first" and "second", however this is not intended to be limiting.

FIG. 4 shows, and has been described with, bits being arranged in rows and columns; for example the vertical check block 408 is shown as having a rectangular/two dimensional structure. However, this is only for the purpose of illustration and is not intended to limit how the bits are arranged logically or in transmission. Further, the code structure shown in FIG. 4 may be divided up for transmission (as discussed further below). Typically all the bits of one vertical check block 408 is transmitted in the same transmission.

The check bits contained in the horizontal check blocks 406 and vertical check blocks 408 are useful to assist decoding at a receiver. For example, after each decoding attempt at a decoder, where check bits are present, error checking can be performed to determine if the horizontal CB 410 has been successfully decoded. The vertical check block 408 contains check bits determined from across multiple horizontal CBs 410, and thus provides information useful for decoding horizontal CBs 410. The decoder may use the check bits of the vertical check block 408 to assist in decoding of a horizontal CB 410.

In transmission, the horizontal CBs 410 may be transmitted including the corresponding horizontal check blocks 406. As will be discussed further below, vertical check blocks 408 may also be transmitted together, or in a separate transmission. It may be noted that it is not necessary for entire vertical CB 420 to be transmitted, because the cross-block bits (i.e., the portion of the vertical CB 420 excluding the vertical check block 408) are already transmitted as part of the horizontal CBs 410.

In examples where the horizontal CBs 410 are systematic (such as low density parity check (LDPC) code or Turbo code), an iterative decoding process may be used at the decoder (at the receiver) to decode the received CBs. The decoder calculates log-likelihood ratios (LLRs) of bit values during decoding of the horizontal CBs, which may be considered "soft" output of the decoder. In the present disclosure, soft output may refer to decoder output that is not yet finalized (e.g., bit value not yet definitively determined to be 1 or 0 value) but may provide information that can still be useful (e.g., in a subsequent decoding iteration). Such soft output may be probabilistic in nature (e.g., LLR). Horizontal CBs 410 that are not correctly decoded (e.g., fails a check using the corresponding horizontal check blocks 406) may benefit from processing the vertical CBs 420. Because each vertical CB 420 includes at least one bit from each horizontal CB 410, soft output from attempts to decode vertical CBs 420 (e.g., LLR) may help to improve decoding of the horizontal CBs 410 (and vice versa). In at least this way, vertical check blocks 408 help to improve decoding.

Figure 5A:
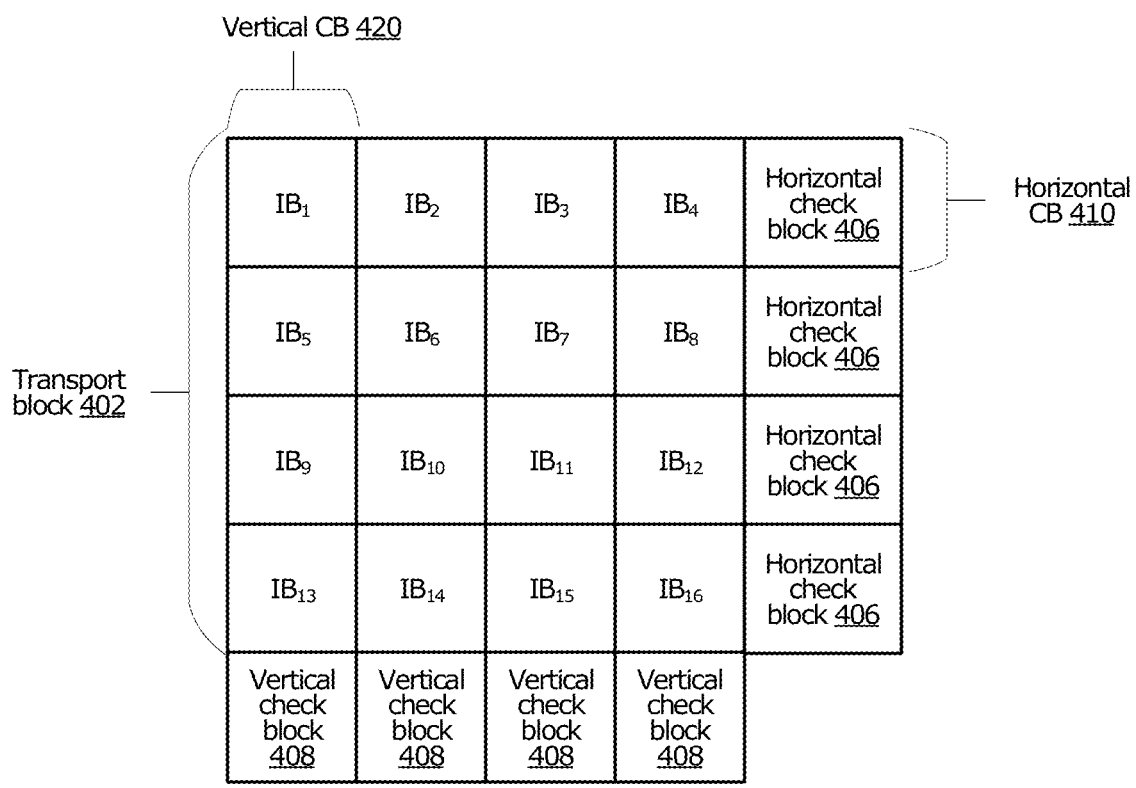
FIGS. 5A and 5B illustrate example uses of different interleavers for generating different sets of vertical check blocks.
Figure 5B:
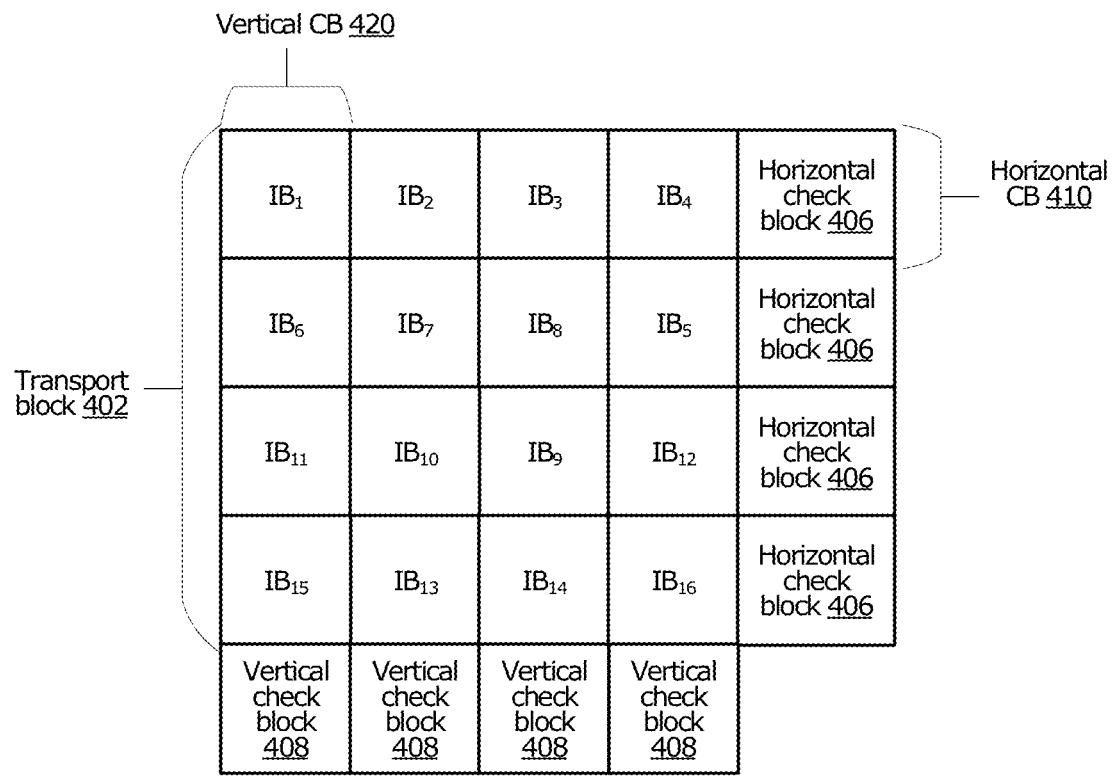

Reference is now made to FIGS. 5A and 5B. As mentioned above, each vertical CB 420 includes cross-block bits and vertical check block 408 determined from the cross-block bits. For a given vertical CB 420, the cross-block bits may include input bits taken from different columns of different horizontal CBs 410. For example, the cross-block bits may include input bits from column x of a first horizontal CB 410, from column y of a second horizontal CB 410, and from column z of a third horizontal CB 410, where x, y and z are different. In another way of thinking, it may be considered that the cross-block bits of the vertical CBs 410 may be formed by taking vertical columns of bits after the bits within a horizontal row are optionally shuffled (also referred to as row-wise shuffling). This row-wise shuffling of the encoder input bits may also be referred to as interleaving or row-wise interleaving. A predefined shuffling scheme or predefined interleaver may be used to perform this shuffling. The present disclosure describes the use of interleavers for such row-wise reordering of the bits, for generating different vertical check blocks 408. An interleaver may be a predefined algorithm or predefined matrix (among other possibilities) that is applied to the row of bits to obtain a reordered row of bits. It should be understood that other techniques (not necessarily limited to interleaving) may be used.

FIG. 5A, for example, illustrates a TB 402 having four horizontal CBS 410, where the information blocks 404 for each horizontal CB 410 has been divided into four sub-blocks, for a total of 16 sub-blocks denoted as $IB_1$, $IB_2$, . . ., $IB_{16}$. The consecutive indices of the sub-blocks illustrated in FIG. 5A represent the natural order (e.g., as outputted by the encoder) of the encoder input bits in each horizontal CB 410. In the example of FIG. 5A, no row-wise shuffling has been performed.

In contrast, consider the example of FIG. 5B. In this example, the encoder input bits have been shuffled in at least one row (represented in FIG. 5B as shuffled indices of the sub-blocks) It can be seen that in the first row, the order of the sub-blocks is not changed, but in the second, third and fourth rows, the order is changed. Notably, the particular sub-blocks that belong to each horizontal CB 410 are unchanged, only the order of the sub-blocks within each horizontal CB 410. This means that the shuffling does not affect the horizontal check block 406 for each respective horizontal CB 410. However, the vertical check blocks 408 in FIG. 5B will differ from the vertical check blocks 408 in FIG. 5A. The vertical check blocks 408 in FIG. 5A may be considered a first set of vertical check blocks 408, and the vertical check blocks 408 in FIG. 5B may be considered a second set of vertical check blocks 408.

Whether shuffling is used and how the encoder input bits are shuffled within each row may be configured at the transmitter (e.g., the BS 170 or the ED 110) and/or defined by a standard. It may be appreciated that shuffling the encoder input bits using different interleavers will result in different sets of vertical check blocks 408 (e.g., the different first and second sets of vertical check blocks 408 in FIGS.

5A and 5B discussed above). In some examples, different sets of vertical check blocks 408 may be generated from the same TB 402, which may help to provide additional information for decoding purposes. For example, different sets of vertical check blocks 408 may be generated for different retransmission attempts.

Although FIGS. 4, 5A and 5B illustrate code structure based on systematic code, this is illustrative only. The present disclosure is not limited to systematic code, and may be equally applicable and implemented with non-systematic code.

Figure 6:
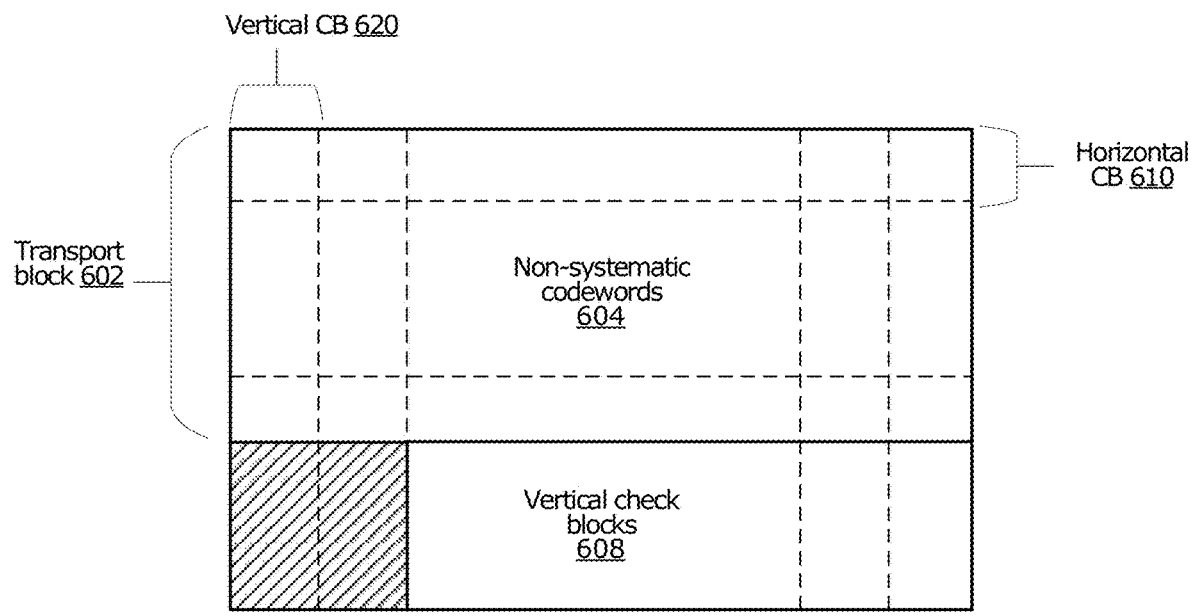
FIG. 6 illustrates an example code structure for a single TB based on non-systematic code, including vertical check blocks.

FIG. 6 illustrates an example code structure for a single TB based on non-systematic code (e.g., Polar code, block code, or convolutional code). Each non-systematic codeword is determined based on a set of encoder input bits, but the encoder input bits do not appear in the codeword as systematic bits. Unlike systematic codes, check bits cannot be simply appended at the end of each row.

The TB 602 includes multiple non-systematic codewords 604. Each non-systematic codeword 604 may be viewed as a horizontal CB 610. Unlike the examples of FIGS. 4, 5A and 5B, the horizontal CB 610 does not include a distinct horizontal check block. Each vertical CB 620 is defined by one or more columns of bits taken across multiple horizontal CBs 610 and include a vertical check block 608, similar to that described for FIG. 4. The vertical CBs 620 are systematic CBs in the sense that they each contain a first section (in this case containing one or more bits from each horizontal CB 610) and a second section (i.e., the corresponding vertical check block 608) containing check bits determined from the first section.

It will be appreciated by persons skilled in the art that the following detailed discussion is not dependent on whether the vertical check blocks are generated from systematic or non-systematic CBs. For simplicity, the following may make reference to and use reference numbers referencing the example of FIG. 4 based on systematic CBs. It should be understood that this is not intended to be limiting.

The preceding discussion describes vertical check blocks generated from cross-block bits in a single TB. Vertical check blocks may also be generated from cross-block bits over two or more TBs. To assist in understanding this further application, a discussion of network coding is provided.

Network coding is a networking technique in which transmitted data is encoded and decoded to help increase network throughput, help reduce delays and/or help improve robustness of the wireless network. Instead of treating two packets as distinct, discrete units of information (as in traditional network routing), network coding enables the two packets to be merged (using a certain defined algebraic algorithm) and the accumulated message delivered to a destination. At the destination, the accumulated message is decoded (using the same defined algorithm). The two packets that are merged in this way may be from two different sources, or two different transmitting devices (e.g., two different antennas, two different transmitters, or two different communication interfaces) of the same source or different sources. The two packets may be intended for the same destination, or two different destinations (e.g., two different receiving devices). In the case where the two packets are intended for two different destinations, additional information may be used at each destination in order to decode and obtain only the packet intended for that destination.

When vertical check blocks are used with network coding, a given vertical check block is generated from bits taken across two or more packets (which may come from single TB or multiple TBs). This may be referred to as two-dimensional (2D) joint coding, where 2D refers to the generation of vertical check blocks (in addition to horizontal check blocks in the case of systematic code), and joint coding refers to how information from the two or more packets are jointly encoded in the vertical check blocks.

The present disclosure describes examples of 2D joint coding, which may be used for physical (PHY) layer network coding. Examples described herein may help to enable wireless network communications with extreme low latency and extreme high reliability (e.g., for ultra-reliable low-latency communication (URLLC) applications). Examples described herein may help to improve performance (e.g., better efficiency, fewer retransmissions) for hybrid automatic repeat request (HARQ) retransmissions. For example, additional coding gain may be achieved during retransmissions, such that fewer retransmissions are required to meet a reliability requirement. Examples described herein may also help to support improved performance of PHY layer data transmission in multi-path and/or multi-hop and/or multi-source and/or multi-destination and/or multi-packets transmissions.

Figure 7:
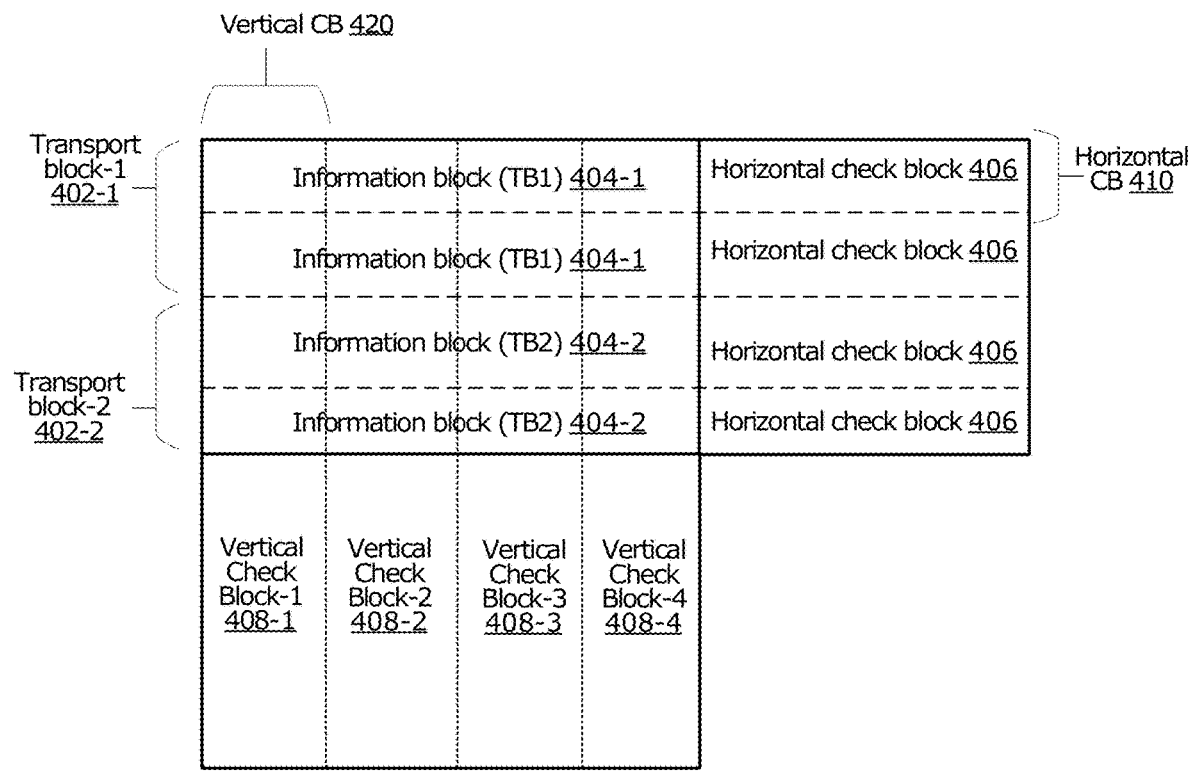
FIG. 7 illustrates an example code structure for a multiple TBs, including horizontal check blocks and vertical check blocks.

FIG. 7 illustrates an example code structure similar to that of FIG. 4. However, unlike FIG. 4, the structure in FIG. 7 includes multiple TBs, in this example TB-1 402-1 and TB-2 402-2 (generally referred to as TB(s) 402). In this example, two TBs 402 are shown for simplicity, however this is not intended to be limiting. TB-1 402-1 has encoder input bits arranged in rows forming information blocks 404-1 (in this example, two information blocks 404-1 are shown for simplicity, however this is not intended to be limiting), and TB-2 402-2 has encoder input bits arrange in rows forming information blocks 404-2 (in this example, two information blocks 404-2 are shown for simplicity, however this is not intended to be limiting). The information blocks 404-1, 404-2 may be generally referred to as information block(s) 404. It should be noted that the number of information blocks 404 in each TB 402 is not necessarily equal. In this example, systematic code is shown, and a horizontal check block 406 is generated from each information block 404. In examples using non-systematic code, there may not be any horizontal check block 406 distinct from the information block 404.

Vertical check blocks 1-4 408-1 to 408-4 (generally referred to as vertical check block(s) 408) are each generated using one or more columns of bits taken across all information blocks 404 (and thus across all TBs 402). That is, each vertical check block 408 is generated from a set of bits that include at least one bit from each information block 404 of each TB 402. In this example, four vertical check blocks 408 are shown for simplicity, however this is not intended to be limiting. The number of vertical check blocks 408 to be used may be based on configuration at the transmitter (e.g., the BS 170 for downlink (DL) transmissions, or the ED 110 for uplink (UL) transmissions) and/or defined by a standard. Further, the number of vertical check blocks 408 may or may not be equal to the number of horizontal check blocks 406.

Similarly to the discussion above with respect to FIGS. 5A, 5B and 6, vertical check blocks 408 that are generated across multiple TBs 402 may be generated based on the encoder input bits in their natural order, or based on shuffled (or interleaved) encoder input bits. Multiple sets of vertical check blocks 408 may be generated for the same set of TBs 402, using different interleavers (e.g., for different retransmissions). The vertical check blocks 408 may be generated for systematic or non-systematic code.

The multiple TBs 402 may originate from one or more sources (and the number of sources may or may not be the same as the number of TBs 402). Multiple TBs 402 may correspond to different packets generated by the same source or different sources. A source may be a network node (e.g., a device in the wireless network, such as a BS 170 or an ED 110), or a transmitting device (e.g., a transmitting antenna or transmitter chain) of a network node. In general, the term network node in the present disclosure may refer to any transmitting and/or receiving node (including relay nodes) in the wireless network, and may include end nodes (e.g., terminal devices or UEs such as an ED 110), as well as nodes that are considered part of a network (e.g., BS 170 or relays). The network node can also be referred to as a communication node, and the terms are used interchangeably herein. Any TRP may be a communication node, include non-terrestrial TRPs such as satellites, high-altitude platform systems (HAPS), network-enabled autonomous vehicles (e.g., drones, unmanned aerial vehicles (UAVs), etc.) Different TBs 402 may be from different network nodes, or may be from different transmitting devices of the same network node, or may be from different applications of the same network node. Different TBs 402 may be intended for different destinations (e.g., different network nodes, such as different EDs 110), or intended for the same destination (e.g., different applications sending information to the same ED 110). Each TB 402 may independently have one or more information blocks 404, and may or may not have the same number of information blocks 404. One skilled in the art would understand that other variations are possible within the scope of the present disclosure.

FIG. 4 and FIG. 7 illustrate that vertical check blocks 408 may be generated using cross-block bits taken from a single TB 402 (as in FIG. 4) or using cross-block bits taken from multiple TBs 402 (as in FIG. 7). Both scenarios may be applicable for multi-packet joint coding, where multiple packets can be encoded in different TBs 402 or the same TBs 402. For example, if the packets are from the same source, the packets may be encoded in a single TB 402 (or the same set of multiple TBs 402). If the packets are from different sources, packets from each different source may be encoded in respective different sets of one or more TBs 402.

The generation of the vertical check blocks 408 may be referred to as cross-block coding, because the bits for generating each vertical check block 408 are taken across multiple information blocks 404 (and as shown in FIG. 7, across multiple TBs 402). The generation of vertical check blocks 408 may also be referred to as cross-packet coding in examples applicable to network coding. Thus, a vertical check block 408 may also be referred to as a cross-block check block (or more specifically cross-TB check block or cross-packet check block in some examples). Similarly, the generation of the horizontal check blocks 406 may be referred to as block-wise (or block-specific) coding, because the bits for generating each horizontal check block 406 are taken from all the bits of a single information block 404. Thus, a horizontal check block 406 may also be referred to as a block-wise (or block-specific) check block (or more specifically TB-wise (or TB-specific) check block or packet-wise (or packet-specific) check block in some examples). The terms "parity block" or "redundancy block" may also be used instead of "check block". For ease of understanding, the following discussion will refer to vertical check blocks and horizontal check blocks, however it should be understood that the terms "vertical" and "horizontal" are not intended to imply any physical structure and are not intended to be limiting.

Example uses of vertical check blocks in various transmission applications are now described. The following examples are described and shown with certain numbers of participating entities (e.g., source, transmitter, destination, relay, terminal device, UE, etc.). The specific numbers shown are not intended to be limiting. For example, there may be any number of an entity shown in plural (e.g., two or more). Although not discussed in detail, the examples may be equally applied in chase combining HARQ or in incremental redundancy (IR) HARQ. Further, different interleavers may be used to generate different vertical check blocks for HARQ retransmissions.

Figure 8A:
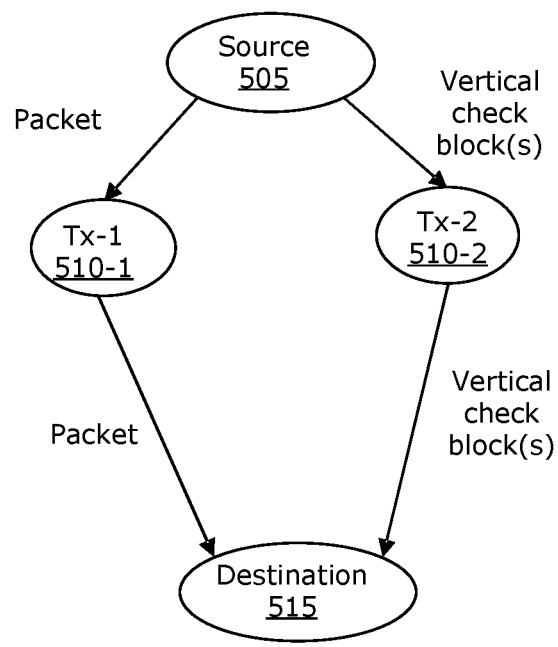
FIGS. 8A and 8B illustrate examples of one-shot HARQ using vertical check blocks.
Figure 8B:
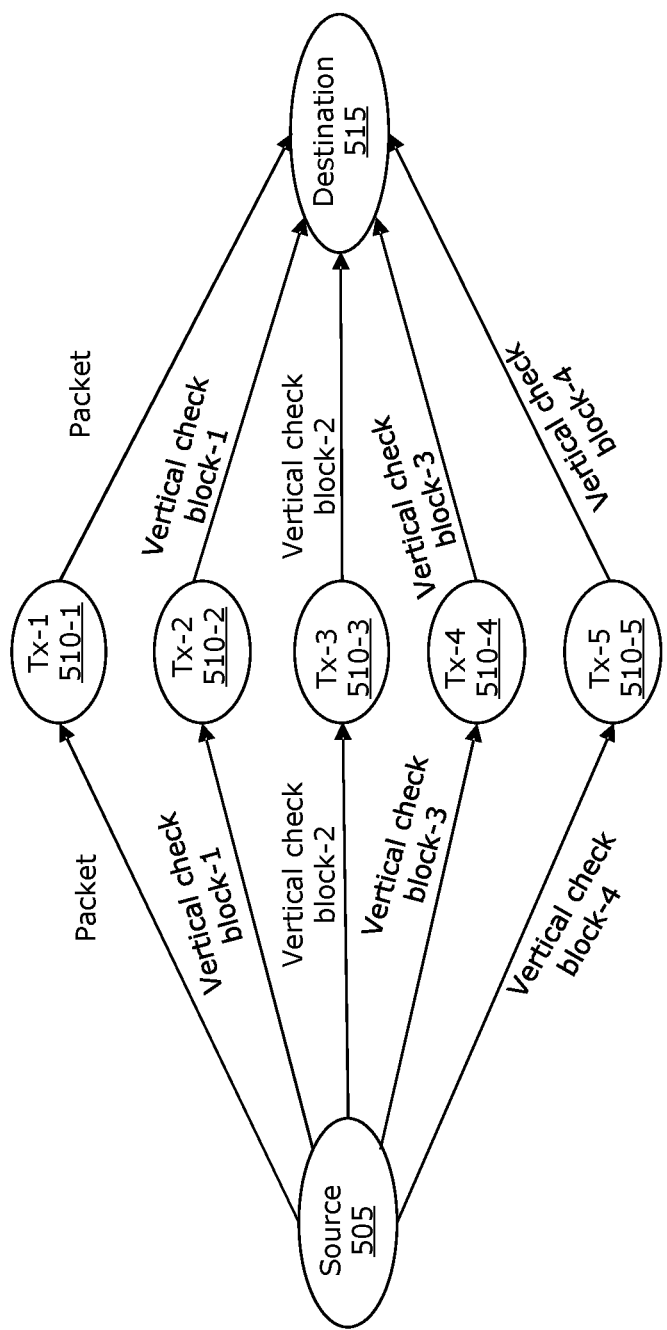

FIGS. 8A and 8B illustrate examples of one-shot HARQ using vertical check blocks (also referred to as 2D coding one-shot HARQ). By "one-shot", it is meant that the packet and associated vertical check block(s) are sent in the same transmission opportunity (TXOP), instead of the vertical check block(s) being sent in a retransmission at a later time. In the present disclosure, sending transmissions in the same transmission opportunity may also be referred to as sending transmissions in the same time interval or the same time slot, sending transmissions simultaneously, or sending transmissions in a single shot. Such one-shot transmission may be useful for applications requiring low latency and high reliability (e.g., URLLC). Although the present disclosure may refer to "simultaneous" transmissions in some instances, it should be understood that such transmissions do not have to be exactly simultaneous or exactly synchronized (e.g., there may be negligible time difference between simultaneous transmissions). Further, transmissions that are sent simultaneously may not be received simultaneously (e.g., due to differences in latency along the transmission paths).

In FIG. 8A, a source node 505 (simply referred to as a source 505) transmits a packet and associated vertical check block(s) to a destination node 515 (simply referred to as a destination 515), via two transmitters (Tx-1 510-1 and Tx-2 510-2, generally referred to as transmitter(s) 510). In the present disclosure, a source 505 is defined as an entity in the wireless system that originates a packet, and a destination 515 is defined as an entity in the wireless system that is the intended final recipient of the packet. A packet may traverse one or more intermediate communication nodes (e.g., relay nodes) before arrival at the destination 515. An intermediate node may be any node along the communication path between the source 505 and the destination 515 (i.e., one or more transmissions between the source 505 and the destination 515 are communicated via the intermediate node). The intermediate node may be physically located anywhere along the communication path between the source 505 and the destination 515. Each intermediate node may be considered a hop along the communication path. For example, if there are two or more intermediate nodes along a single communication path between the source 505 and the destination 515, this may be referred to as multi-hop communication (or multi-hop relay). It should be noted that there may be multiple different communication paths between a given source 505 and a given destination 515, and each communication path may traverse respective one or more (or none) intermediate nodes. It should be noted that the communication path between the source 505 and the destination 515 may traverse any number of intermediate nodes (or no intermediate nodes), and is not limited to only the most direct path (e.g., straightest, shortest, or fewest nodes traversed). For example, an intermediate node along the communication path between the source 505 and the destination 515 is not necessarily physically located in the straightest or shortest path between the source 505 and the destination 515. Further, in some examples, the source 505, the destination 515 and/or the intermediate node may be mobile, such that the communication path (and any intermediate nodes along the communication path) may be dynamically changing.

For DL transmissions, the source 505 may be the BS 170 and the destination 515 may be the ED 110; for UL transmission, the source 505 may be the ED 110 and the destination 515 may be the BS 170; for SL transmissions (e.g., for UE-to-UE, D2D, V2V or V2X communications), the source 505 may be a first ED 110 and the destination 515 may be a second ED 110. The transmitters 510 may each be a network node different from the source 505 (e.g., intermediate nodes, relay nodes or TRPs), may each be different antennas (or transmitter chains) of the source 505, may each be different antennas of a network node other than the source 505, or combinations thereof (e.g., Tx-1 510-1 may be an antenna of the source 505 and Tx-2 510-2 may be a relay node or TRP), among other possibilities. In examples where a transmitter 510 is a network node different from the source 505, the source 505 may communicate with the transmitter 510 via wireless communications. In examples where a transmitter 510 is part of the source 505, the source 505 may provide packets and other communications to the transmitter 510 via internal signals. In some examples, the transmitters 510 may be at different network nodes, which may be BSs. For example, the source 505 may be located in one BS 170 and may share a packet or data to be transmitted with another BS 170 (e.g., via a BS-to-BS link). In some examples, one transmitter 510 may be at one network node that is a BS 170 and another transmitter 510 may be at another network node that is a relay. In this case, the BS 170 may share the packet/date with the relay node via backhaul link, for example. In some examples, one transmitter 510 may be at one network node that is a BS 170 or relay node and another transmitter 510 may be at another network node that is an ED 110. In some examples, the source 505 may be at a BS 170, one or both transmitters 510 may be at an ED 110, and the destination 515 may also be at an ED 110. The ED 110 where the transmitter 510 resides and the ED 110 where the destination 515 resides may both be served by the same BS 170 (e.g., the BS 170 where the source 505 resides) or by different BSs 170. Other variations may be possible.

One or more vertical check blocks are generated for the packet. Generation of the vertical check block(s) may be performed at the source 505, or may be performed at another network node and provided to the source 505. The source 505 provides at least one vertical check block to Tx-2 510-2 for transmission to the destination 515, and provides the packet (and optionally one or more vertical check blocks) to Tx-1 510-1 for transmission to the destination 515. If one or more vertical check blocks are provided together with the packet to Tx-1 510-1, different vertical check block(s) may be provided to Tx-2 510-2 (e.g., where multiple vertical check blocks have been generated for the packet); alternatively, at least one vertical check block may be provided to both Tx-1 510-1 and Tx-2 510-2.

FIG. 8B illustrates another example of one-shot HARQ transmission including vertical check blocks. FIG. 8B is similar to the example of FIG. 8A, however there are five transmitters (Tx-1 to Tx-5 510-1, . . . , 510-5, generally referred to as transmitter(s) 510). The source 505, destination 515 and transmitters 510 may be defined as discussed above.

In FIG. 8B, four different vertical check blocks 1-4 are generated for the packet. Each vertical check block may be provided by the source 505 to a respective different transmitter 510 (e.g., Tx-2 to Tx-5 510-2, . . . 510-5), with the packet being provided to yet another different transmitter (e.g., Tx-1 510-1). Each transmitter 510 transmits its respective payload (packet or respective vertical check block) to the destination 515. As discussed above for FIG. 8A, there may be overlap or duplication in the payload provided to and transmitted by each transmitter 510.

FIGS. 8A and 8B in general illustrate a transmission scheme in which at least one vertical check block generated for a packet is transmitted along a transmission path different from the transmission path of the packet. This may enable a one-shot HARQ transmission, in which vertical check block (s) may be transmitted in the same time interval as the associated packet. Such a transmission scheme may be referred to as distributed cooperative HARQ, and may be used for transmission of a packet (having multiple information blocks) and associated vertical check block(s). The data packet and its associated vertical check block(s) are transmitted in a one-shot (e.g., at the same transmission opportunity) from the transmitters 510 to the destination 515. The vertical check blocks associated with the packet may be generated using different interleavers across the information blocks of the packet, or may be different vertical check blocks generated from different cross-block bits using the same interleaver. Multiple transmitters 510 may be used to transmit different vertical check blocks.

In some examples, instead of the source 505 providing each transmitter 510 with respective vertical check blocks (as shown in FIG. 8B), one transmitter 510 may receive a vertical check block from another transmitter 510. For example, the source 505 may provide the packet together with vertical check block-1 and vertical check block-2 to Tx-1 510-1; Tx-1 510-1 may then share (e.g., via SL or wireless transmission if different network nodes, or via internal signaling if different antennas of the same network node) vertical check block-1 and vertical check block-2 with Tx-2 510-2 and Tx-3 510-3 respectively. In some examples, one (or more) of the transmitters 510 may be an ED 110 (e.g., serving in the role of a relay, or providing UE-to-UE cooperation/assistance).

In the example shown, the source 505 provides the vertical check block(s) (e.g., the source 505 generates the vertical check block(s)). In other examples, the source 505 may provide the packet to a first transmitter 510, which in turn generates the vertical check block(s) (at the first transmitter 510) and optionally shares the generated vertical check block(s) to other transmitters 510.

Other variations may be possible for the one-shot HARQ described above. In general, for the example one-shot HARQ, at least one vertical check block generated for a packet is transmitted along a transmission path different from the transmission path of the packet, and transmission of the at least one vertical check block to the destination 515 is at the same time (e.g., at same transmission opportunity) as transmission of the packet (along a different path) to the destination 515. The example one-shot HARQ transmission scheme may enable high reliability with low latency. The one-shot transmission of the packet and associated vertical check block(s) may be subsequently followed by a retransmission of the packet and/or (same or different) vertical check block(s), in some examples.

Figure 9A:
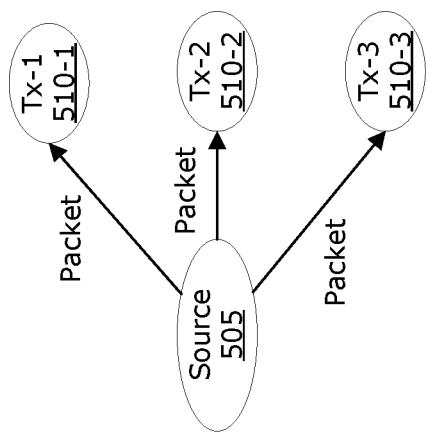
FIGS. 9A-C illustrate an example of joint HARQ with vertical check blocks being sent in a retransmission.
Figure 9C:
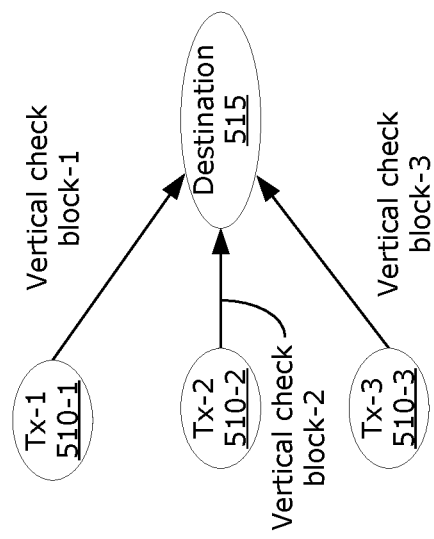
Figure 9B:
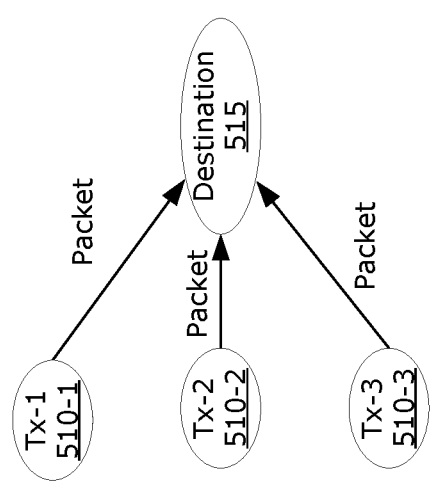

FIGS. 9A-C illustrate an example of joint HARQ with vertical check blocks being sent in a retransmission (also referred to as 2D coding joint HARQ or 2D coding multi-shot HARQ). FIGS. 9A-C may be contrasted with FIGS. 8A and 8B in that the packet and the associated vertical check block(s) are sent at different time steps (also referred to as transmission at different transmission opportunities, at different time intervals, or at different time slots).

The source 505, destination 515 and transmitters 510 may be as defined above (e.g., transmitters 510 may be network nodes, relay nodes, transmitter chains, etc.). FIGS. 9A-C each illustrate a different time step. Although described as first, second and third time steps, it should be understood that the communications shown in FIGS. 9A-C do not necessarily directly follow one after the other. For example, SL communications or joint communications among the transmitters 510, waiting periods and latency periods (e.g., due to internal processing, such as generating vertical check blocks) are not illustrated.

In FIG. 9A (first time step), the source 505 provides a data packet to each transmitter 510. In FIG. 10B (second time step) one or more of the transmitters 510 provide the packet to the destination 515 in a first transmission. FIG. 9B shows all three transmitters 510 transmitting the packet to the destination 515. In other examples fewer than all of the transmitters 510 may participate in the first transmission. For example, if the wireless interface between Tx-1 510-1 and the destination 515 is reliable, it may be sufficient for Tx-1 510-1 alone to transmit the packet to the destination 515. Generally, having more than one transmitter 510 transmit the packet to the destination 515 may help to improve reliability of the transmission.

Some time after receiving the packet, vertical check blocks are generated for the packet. Vertical check blocks may be generated by one or more of the transmitters 510. For example, each Tx 1-3 510-1, 510-2, 510-3 may generate respective different vertical check blocks 1-3 (e.g., using different interleavers) from the packet. Alternatively, vertical check blocks may be generated by fewer than all of the transmitters 510 and shared with other transmitters 510. For example, Tx-1 510-1 (which may be located at the source 505, such as being a transmitting device of the source 505) may generate all vertical check blocks 1-3 and share vertical check blocks 2 and 3 with Tx-2 510-2 and Tx-3 510-3.

In FIG. 9C (third time step), vertical check blocks are transmitted to the destination 515 in a retransmission. FIG. 9C shows each transmitter 510 transmitting a respective vertical check block to the destination 515. In other examples, fewer than all of the transmitter 510 may participate in the retransmission (e.g., depending on availability of each transmitter 510 and/or quality of the wireless interface at each transmitter 510). Generally, having more than one transmitter 510 transmit a respective vertical check block to the destination 515 may help to improve reliability of the retransmission, and may provide more information to the destination 515 to enable correct decoding of the packet.

The retransmission (shown in FIG. 9C) may be repeated with the same or different vertical check blocks (e.g., a different set of vertical check blocks may be generated with different interleaver for each retransmission attempt) until an acknowledgement (ACK) response from the destination 515 is received by at least one transmitter 510. A transmitter 510 that receives an ACK response may communicate this with other transmitters 510, so that all transmitters 510 terminate retransmission after any one transmitter 510 receives an ACK response from the destination 515. Additionally or alternatively, the transmitters 510 may terminate retransmission after a predefined number of retransmission attempts (e.g., after a predefined internal counter reaches zero) and/or after a predefined period of time (e.g., after a predefined internal timer expires).

Other variations to the transmission scheme of FIGS. 9A-C may be possible. For example, the transmission of the packet in FIG. 9B may be from a first subset of the transmitters 510 (e.g., only Tx-1 510-1) and the retransmission of the vertical check blocks in FIG. 9C may be from a second subset (overlapping or not overlapping with the first subset) of the transmitters 510 (e.g., only Tx-2 510-2 and Tx-3 510-3). In another example, there may be multiple relay nodes or hops between the source 505 and the transmitters 510. In some examples, horizontal check block(s) (e.g., in the case of systematic codes) may additionally be transmitted in one or more retransmission attempts. In such cases, horizontal check block(s) may be included in the same retransmission as vertical check blocks in FIG. 9C, or may be separately retransmitted. In another example, there may be retransmission of vertical check block(s) from the source 505 to at least one transmitter 510, which may help to ensure the packet is correctly received by the transmitter 510. In some examples, the transmission from the source 505 to the destination 515 may use two-stage HARQ, in which a first stage involves HARQ (with retransmission of vertical check block(s)) between the source 505 and at least one transmitter 510 (and ACK is transmitted by the transmitter 510 to the source 505), and a second stage involves HARQ (with retransmission of vertical check block(s)) between the transmitter 510 and the destination 515 (and ACK is transmitted by the destination 515 to the transmitter 510). In another example, the transmission from the source 505 to the destination 515 may use end-to-end HARQ, in which the transmitter(s) 510 function as relays, and the destination 515 transmits ACK to the source 505 via the transmitter(s) 510.

Figure 10A:
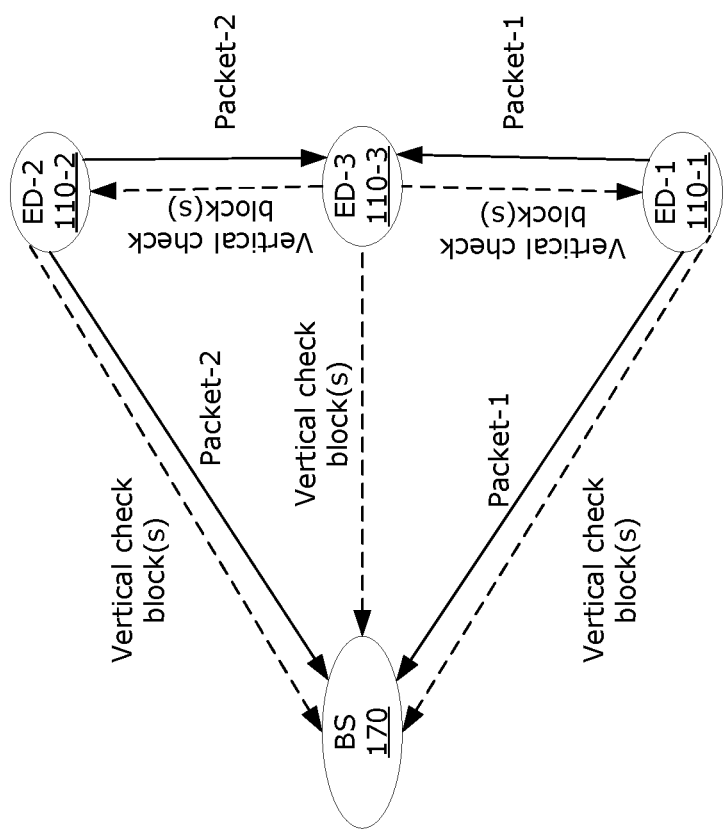
FIGS. 10A and 10B illustrate an example of cooperative UL transmission using vertical check blocks.
Figure 10B:
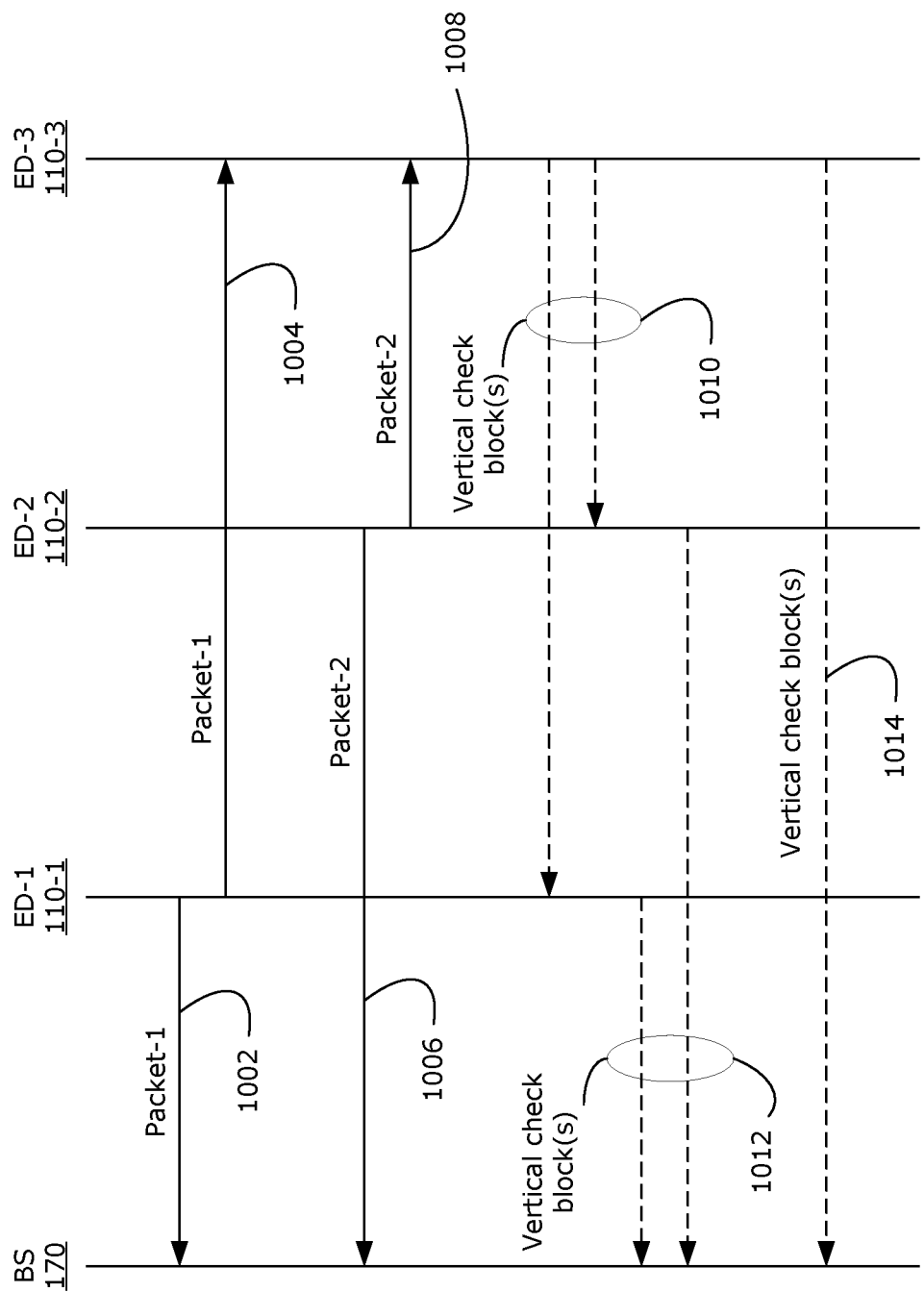

FIGS. 10A and 10B illustrate an example of cooperative UL transmission using vertical check blocks. By "cooperative", it is meant that instead of one ED 110 sending the UL transmission to the BS 170 by itself, one or more other EDs 110 participate in and assist with the UL transmission. Cooperation between two or more EDs 110 may make use of SLs between EDs 110 for data sharing. Such cooperative UL transmission may help improve reliability and/or reduce latency.

In FIG. 10A, three EDs (ED-1 110-1, ED-2 110-2 and ED-3 110-3, generally referred to as ED(s) 110) are involved in an UL transmission to the BS 170. Each ED 110 may independently be any electronic device (e.g., smartphones, UEs, STAs, vehicle, sensor, wearable devices etc.). ED-1 110-1 and ED-2 110-2 each have a respective SL interface with at least ED-3 110-3. Optionally, ED-1 110-1 and ED-2 110-2 may also have a SL interface with each other. FIG. 10B is an example signaling diagram for the transmissions illustrated in FIG. 10A. FIGS. 10A and 10B are described together.

In this example, data packet-1 and data packet-2 originate from ED-1 110-1 and ED-2 110-2, respectively. ED-1 110-1 and ED-2 110-2 each sends the respective packet-1 and packet-2 over the UL interface to the BS 170 (at 1002 and 1006 respectively). The transmissions at 1002 and 1006 may overlap in time (e.g., occur at the same transmission opportunity) over same frequency or different frequency resources or at different times.

ED-1 110-1 and ED-2 110-2 also each sends the respective packet-1 and packet-2 over respective SL interfaces to ED-3 110-3 (at 1004 and 1008 respectively). The transmissions at 1004 and 1008 may overlap in time (e.g., occur at the same transmission opportunity) or at different times. The transmissions at 1004 and 1008 may occur before, in during, or after the transmissions at 1002 and 1006.

After receiving packet-1 and packet-2, ED-3 110-3 performs 2D joint coding on packet-1 and packet-2 together, to generate one or more vertical check blocks. The generated vertical check block(s) are then transmitted via UL to the BS 170 in various ways.

In an example, ED-3 110-3 transmits at least one vertical check block to at least one of ED-1 110-1 and ED-2 110-2 via SL interface (at 1010). If ED-3 110-3 shares at least one vertical check block with each of ED-1 110-1 and ED-2 110-2, same or different vertical check block(s) may be shared with each of ED-1 110-1 and ED-2 110-2. After at least one of ED-1 110-1 and ED-2 110-2 receives at least one vertical check block from ED-3 110-3, the at least one of ED-1 110-1 and ED-2 110-2 transmits the received at least one vertical check block UL to the BS 170 (at 1012). In this example, the at least one of ED-1 110-1 and ED-2 110-2 acts as a relay to relay at least one vertical check block from ED-3 110-3 to the BS 170.

In another example, ED-3 110-3 transmits at least one vertical check block directly to the BS 170 (at 1014).

In another example, some combination of the transmissions at 1010, 1012 and 1014 may be used, such that at least one vertical check block is transmitted to the BS 170 by any one (or more) of the EDs 110. For example, vertical check block(s) may be relayed to the BS 170 via at least one of ED-1 110-1 and ED-2 110-2, and also may be transmitted directly to the BS 170 from ED-3 110-3.

In examples where more than one ED 110 transmits (directly or as a relay) vertical check block(s) to the BS 170, the vertical check block(s) transmitted by each ED 110 may be all the same for all EDs 110, may be all different for different EDs 110, or may have some overlap or duplication between EDs 110. Other such variations are possible.

Although three EDs 110 are involved in the cooperative UL transmission described above, it should be understood that more than three or fewer than three (but at least two) EDs 110 may be involved. For example, packet-1 and packet-2 may both originate from one ED 110, and a second ED 110 assists to transmit vertical check block(s) generated by the first ED 110. In another example, packet-1 and packet-2 originate from ED-1 110-1 and ED-2 110-2 respectively, ED-1 110-1 shares packet-1 with ED-2 110-2 over a SL interface, and ED-2 110-2 performs 2D joint coding to generate the vertical check block(s). Other such variations are possible. In some examples, ED-1 110-1 and/or ED-2 110-2 may share the respective packet-1 or packet-2 with ED-3 110-3 over a respective SL interface, and ED-3 110-3 may then transmit the received packet-1 and/or packet-2 to the BS 170. In some examples, ED-3 1103 may act as a relay, and may simply forward packet(s) and/or vertical check block(s) (received by ED-3 110-3 from ED-1 110-1 and/or ED-2 110-2) to the BS 170.

In general, FIGS. 10A and 10B show examples in which two or more EDs 110 assist each other by sharing data packets, to enable at least one of the EDs 110 to generate a set of vertical check block(s) which is then transmitted by at least one of the EDs 110 to the BS 170.

Figure 11A:
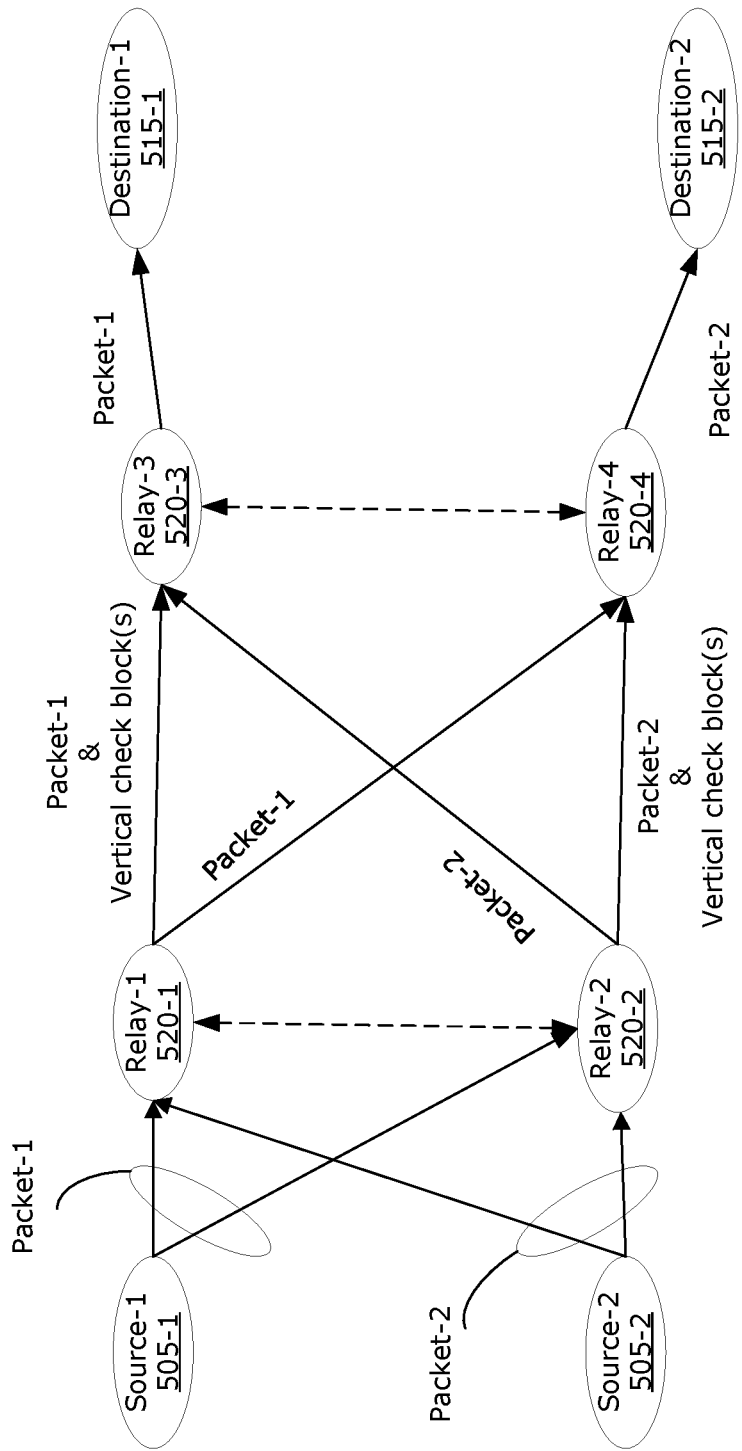
FIGS. 11A-C illustrate examples for multi-hop relay network coding using vertical check blocks.
Figure 11B:
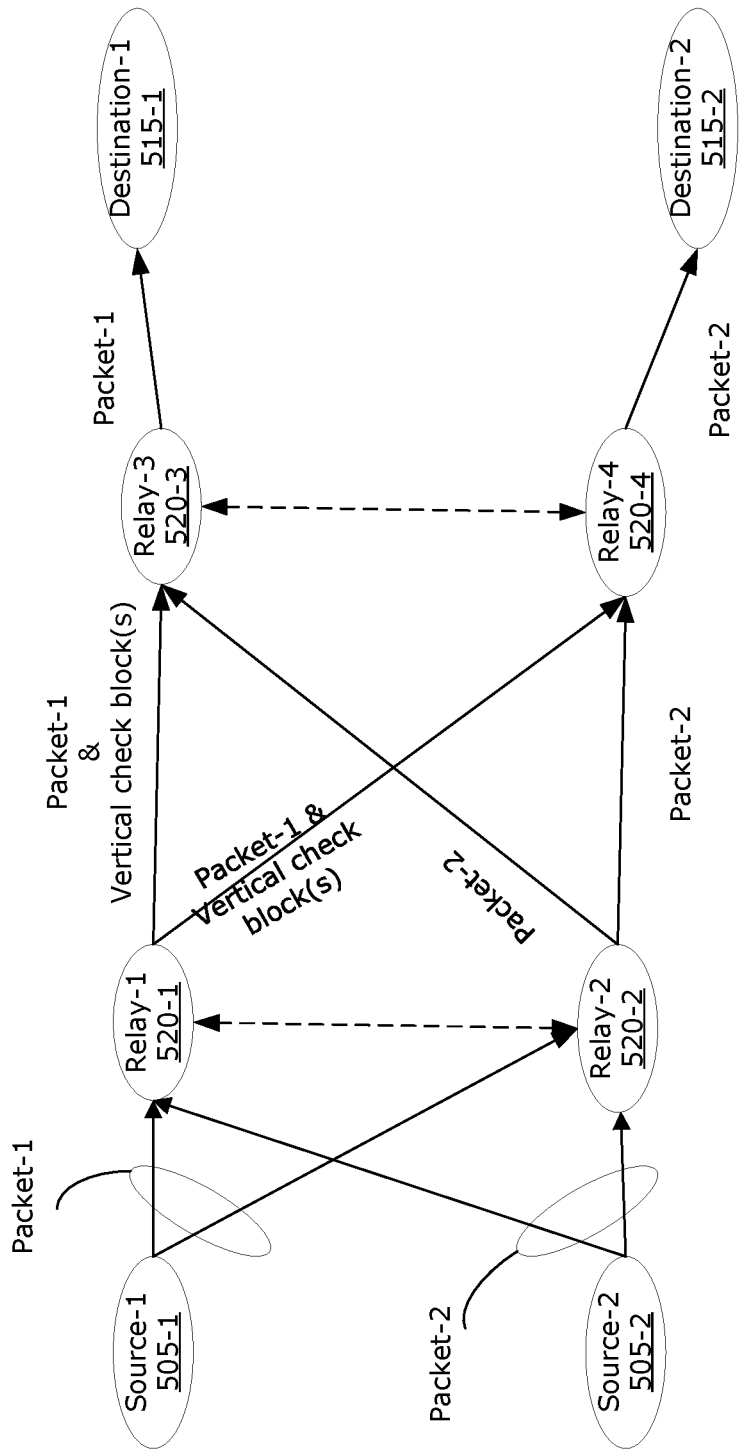
Figure 11C:
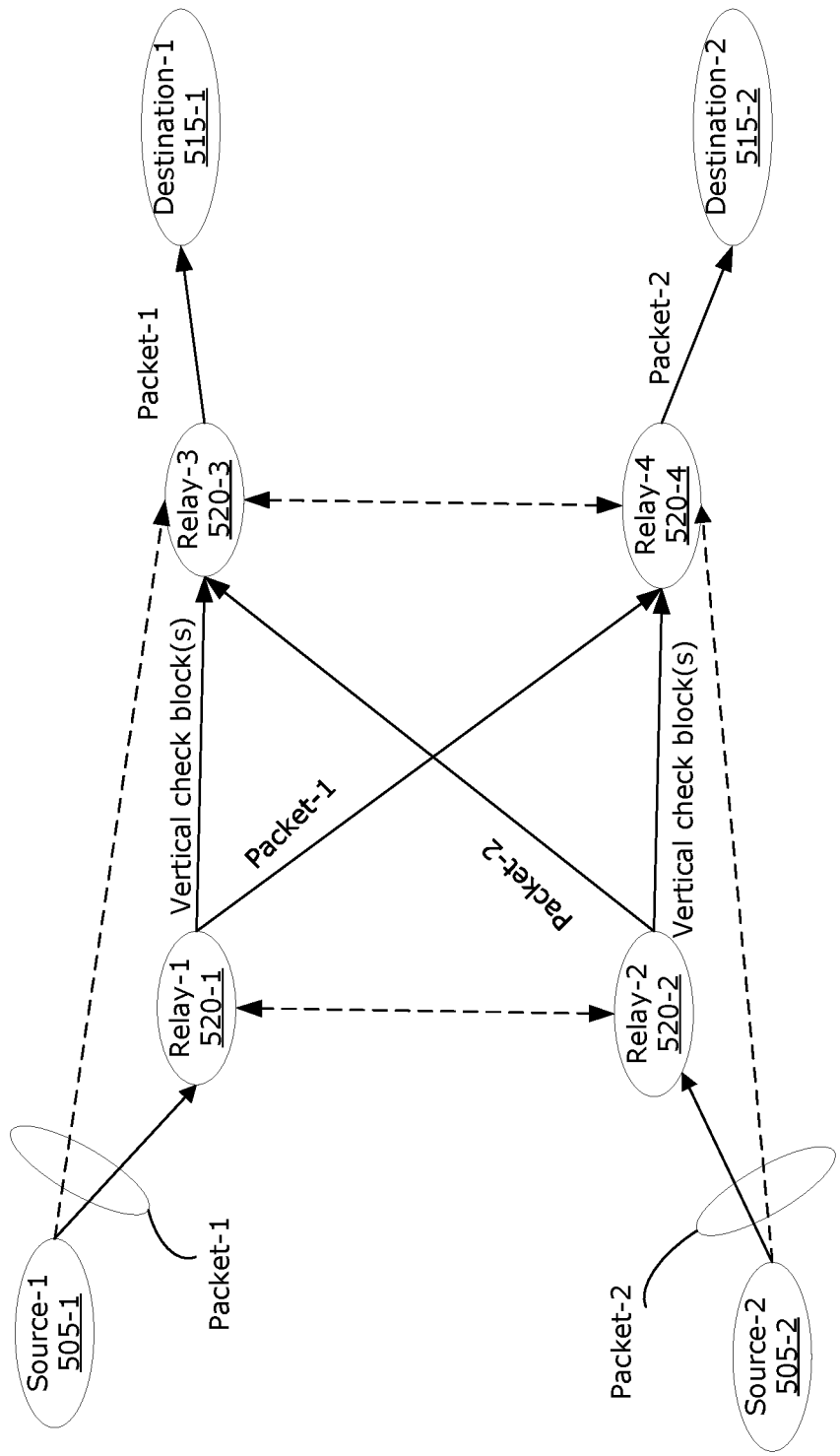

FIGS. 11A-C illustrate examples for multi-hop relay network coding using vertical check blocks. The term "multi-hop" refers to the use of multiple relays in the transmission path between the source and the destination. In other words, each relay may be considered one "hop" in the transmission path. In network coding examples where a packet travels multiple different transmission paths from source to destination, the number of hops in each transmission path may or may not be equal. For ease of reference, all relays participating in a first hop across different transmission paths may be jointly referred to as first-hop relays, and may be described as participating in the same hop in the transmission path. Similar terminology may be used to describe other relays participating in other hops. Further, the last relays in the transmission paths (i.e., the relays immediately preceding reception of the packets at the intended destinations) may be referred to as last-hop relays, and may be described as participating in the last hop in the transmission paths.

In the examples of FIGS. 11A-C, source-1 505-1 and source-2 505-2 (generally referred to as source(s) 505) each originate respective packet-1 and packet-2. Packet-1 and packet-2 are intended for transmission to destination-1 515-1 and destination-2 515-2 (generally referred to as destination(s) 515), respectively. In some examples, source-1 505-1 and source-2 505-2 may each independently be instead Tx-1 and Tx-2 (e.g., two antennas or two transmitter chains of the same source). In other examples, packet-1 and packet-2 may originate from different applications at the same source. A source may be a BS 170, for example, and a destination 515 may be an ED 110. Other such variations may be possible.

FIGS. 11A-C also include four relays 1-4 520-1, . . . 520-4 (generally referred to as relay(s) 520). The role of the relay 520 (also referred to as a relay node) may be performed by any entity in the network, for example a router, an AP, a TRP, a relay node, a UE, etc. In examples where the role of the relay 520 is performed by a UE, the relay may be referred to as a UE relay; in examples where the role of the relay 520 is performed by a non-UE entity, the relay may be referred to as a network relay. Generally, the relay 520 is a distinct network node from the source 505 and the destination 515. In this example, four relays 520 are shown to illustrate two-hop transmission paths. Relay-1 520-1 and relay-2 520-2 are shown as the first hop in the transmission paths (thus may be referred to as first-hop relays or more generally a first set of relays 520), and relay-3 520-3 and relay-4 520-4 are shown as the second hop in the transmission paths (thus may be referred to as second-hop relays or more generally a second set of relays 520). There may be greater or fewer number of relays 520, and more than two hops in the transmission path.

In the example of FIG. 11A, source-1 505-1 transmits packet-1 to relay-1 520-1 and relay-2 520-2. Similarly, source-2 505-2 transmits packet-2 to relay-1 520-1 and relay-2 520-2. Relay-1 520-1 and relay-2 520-2 can optionally exchange packet-1 and packet-2 (e.g., over a SL interface or inter-relay link/interface). This exchange of data packets enables each relay-1 520-1 and relay-2 520-2 to independently perform 2D joint coding and generate respective vertical check block(s). It should be noted that the vertical check block(s) generated by each of relay-1 520-1 and relay-2 520-2 may be different (e.g., using different interleavers). Relay-1 520-1 then transmits packet-1 and vertical parity block(s) (generated at relay-1 520-1) to relay-3 520-3, and transmits packet-1 to relay-4 520-4. Similarly, relay-2 520-2 transmits packet-2 and vertical parity block(s) (generated at relay-2 520-2) to relay-4 520-4, and transmits packet-2 to relay-3 520-3. Each of relay-3 520-3 and relay-4 520-4 thus receives both packet-1 and packet-2 and a respective set of vertical check block(s). Relay-3 520-3 uses this information to decode and recover packet-1, and forwards packet-1 to destination-1 515-1. Similarly, relay-4 520-4 decodes and recovers packet-2, and forward packet-2 to destination-2 515-2.

FIG. 11B illustrates a variation of FIG. 11A. The transmission scheme in FIG. 11B is similar to those of FIG. 11A, however vertical check block(s) are generated only at relay-1 520-1. Relay-1 520-1 then transmits (e.g., using a separate channel, or using multicast or broadcast transmission) the generated vertical check block(s) to both relay-3 520-3 and relay-4 520-4. Thus, only one (or fewer than all)

of the first-hop relays performs the 2D joint coding process, which map help to reduce consumption of network resources. Further, if a separate channel is used for transmission of the vertical check block(s) from relay-1 520-1 to relay-3 520-3 and relay-4 520-4, there may be a reduction in consumption of transmission resources. A possible tradeoff is that fewer sets of vertical check block(s) are generated, which may reduce the information available to assist in decoding and/or reduce redundancy (and possible robustness) in transmission paths.

FIG. 11C illustrates another variation of FIGS. 11A and 11B. In this variation, instead of each source 505 transmitting respective packets to each of the first-hop relays (relay-1 520-1 and relay-2 520-2), each source 505 instead transmits its originating packet to one first-hop relay and optionally one second-hop relay. Specifically, in the example shown in FIG. 11C, source-1 505-1 sends packet-1 relay-1 520-1 and optionally relay-3 520-3; similarly source-2 505-2 sends packet-2 to relay-2 520-2 and optionally relay-4 520-4. As in the example of FIG. 11A, relay-1 520-1 and relay-2 520-2 share packets over a SL interface and generate respective sets of vertical check block(s). The vertical check block(s) generated by each of relay-1 520-1 and relay-2 520-2 may be different (e.g., using different interleavers). Relay-1 520-1 then transmits packet-1 and vertical parity block(s) (generated at relay-1 520-1) to relay-3 520-3, and transmits packet-1 to relay-4 520-4. If source-1 505-1 has transmitted packet-1 directly to relay-3 520-3, then it may not be necessary for relay-1 520-1 to transmit packet-1 to relay-3 520-3. Similarly, relay-2 520-2 transmits packet-2 and vertical parity block(s) (generated at relay-2 520-2) to relay-4 520-4, and transmits packet-2 to relay-3 520-3. If source-2 505-2 has transmitted packet-2 directly to relay-4 520-4, then it may not be necessary for relay-2 520-2 to transmit packet-2 to relay-4 520-4. The second-hop relays (relay-3 520-3 and relay-4 520-4) decode and recover respective packets for transmission to respective destinations 515.

Variations in addition to those explicitly illustrated in the drawings may be possible. Aspects of FIGS. 11A-C may be used in combination. For example, a variation of FIG. 11C may be possible in which only one of the first-hop relays performs the 2D joint coding (similar to that shown in FIG. 11B) and transmits the generated vertical check block(s) to all the second-hop relays.

There may be other variations. For example, there may be more than two hops. In another example, relays (e.g., relays belonging to the same hop) may share information over a SL interface. The relays may share data packets with each other so that each source does not need to transmit its originating data packet to all first-hop relays. The relays in the last hop of the transmission path perform decoding to recover the packets intended for respective destinations. These last-hop relays may share information (e.g., soft information from decoding attempts) to help each other in decoding the packets.

In some examples, at least one vertical check block may be generated by at least one source (e.g., source-1 505-1 and/or source-2 505-2) and transmitted to a relay 520 to be further transmitted to a destination 515. This may be in addition to any vertical check block(s) generated by the relay 520 itself, as discussed above.

In examples where there are more than two hops, 2D joint coding to generate vertical check block(s) may be performed at any hop other than the last hop (i.e., not necessarily at the first-hop relays).

In another example, the transmission of information from one hop to the next hop may not be symmetrical, meaning that the set of transmission paths traversed by each packet do not mirror each other, the actions of the relays participating in the same hop of the transmission paths do not mirror each other, traffic at each stage of transmission is not balanced for every transmission path, etc. Symmetrical transmission schemes (e.g., as illustrated in FIGS. 11A and 11C) may be useful for load balancing, ease of implementation and/or increased redundancy. Asymmetrical transmission schemes (e.g., as illustrated in FIG. 11B) may be useful for more efficient use of network resources (e.g., to take advantage of joint coding capabilities at a particular network node), where the packet sizes of different packets are different, where the available channel resources of each transmission path are different, and/or where transmission conditions are unequal among network nodes.

In general, the examples of FIGS. 11A-C illustrate implementations of 2D joint coding in which the generation of a set of vertical check block(s) is performed by at least one relay at at least one hop (other than the last hop) in a multi-hop transmission scheme, and the set of vertical check block(s) is provided to the last-hop relays together with the associated packets to enable decoding and recovery of packets, which the last-hop relays then transmit to respective intended destinations.

In some examples, instead of joint coding being performed at a relay, joint coding may be performed by one of the sources 505. For example, sources 505 may share data packets with each other over a backhaul link, and may further share generated vertical check block(s) with each other over the backhaul link. The sources 505 may then transmit the vertical check block(s) together with the packets to the relays.

Figure 12A:
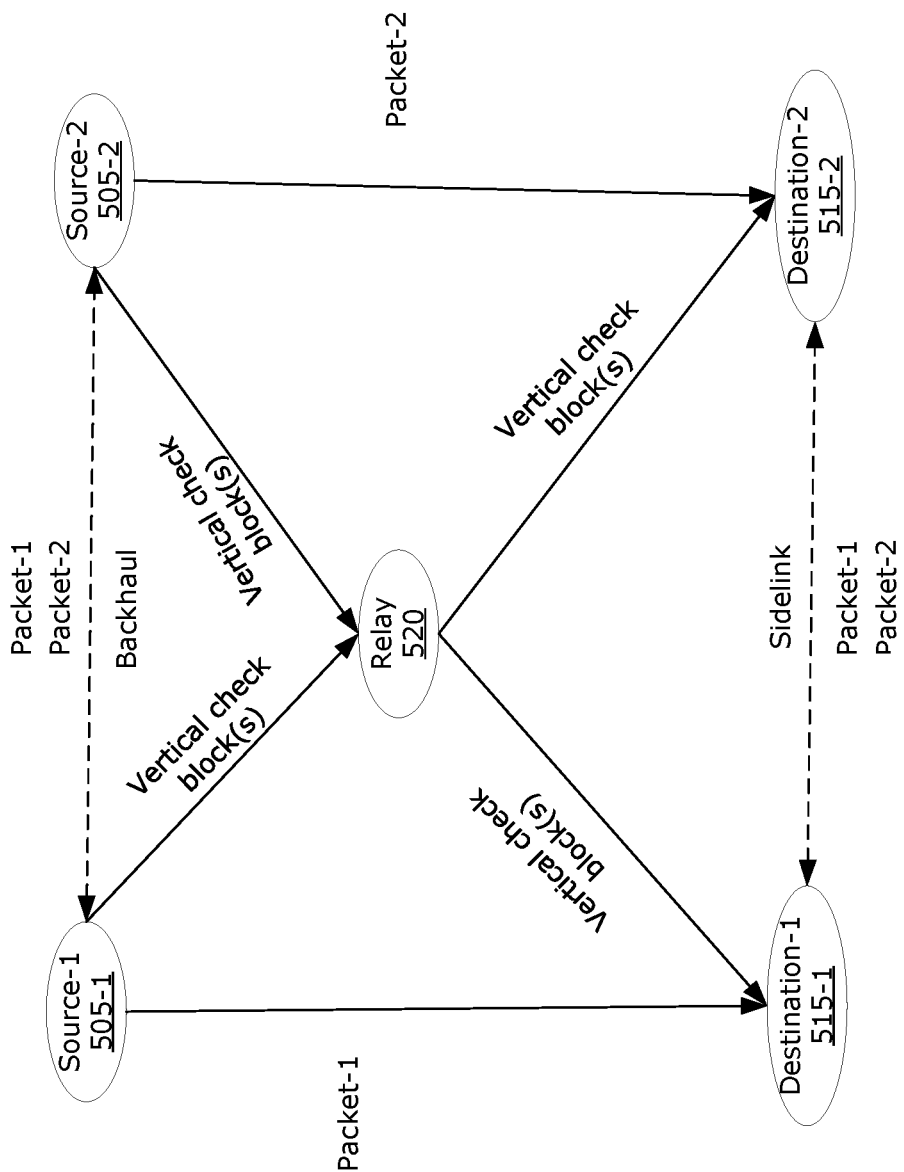
FIGS. 12A and 12B illustrate other examples of joint HARQ.

FIG. 12A illustrates an example in which sources share data over a backhaul link, for performing 2D joint coding. FIG. 12A illustrate an example of joint HARQ, including the use of vertical check blocks. By "joint HARQ", it is mean that an intended destination receives an intended packet and vertical check block(s) associated with the packet jointly from different network nodes. For example, the one-shot HARQ examples described with respect to FIGS. 8A and 8B may be considered examples of joint HARQ. In this example, multiple sources 505 (source-1 505-1 and source-2 505-2 in the shown example) transmit respective packets intended for respective destinations 515 (destination-1 515-1 and destination-2 515-2 in the shown example) via a relay 520. The definitions of sources 505, destinations 515 and relay 520 may be as discussed previously.

The sources 505 share data packets with each other over a backhaul link or inter-source link. At least one source 505 (or both sources 505) uses this information to perform 2D joint coding across the packets, to generate a respective set of vertical check block(s). If joint coding is performed by more than one source 505, each source 505 may perform joint coding using the same interleaver or different interleavers. Accordingly, the set of vertical check block(s) generated by each source 505 may be the same or different. Each source 505 transmits its respective originating packet to the intended destination 515. The source(s) 505 that performed joint coding also transmits its respective set of vertical check block(s) to the relay 520. The relay 520 transmits at least one set of vertical check block(s) to each destination 515 (e.g., if the relay 520 received two different sets of vertical check block(s) from two different sources 505, the relay 520 may transmit each set of vertical check block(s) to a respective different destination 515, or may transmit both sets of vertical check block(s) to both destinations 515; or if only one set of vertical check block(s) was generated, only one set of vertical check block(s) may be sent). The destinations 515 share the received packets over a SL interface. Each destination 515 thus receives both packet-1 and packet-2, and at least one set of vertical check block(s) generated by at least one source 505, thus enabling each destination 515 to decode and recover the respective intended packet. In some examples, the destinations 515 may share information over the SL interface to assist each other in decoding the packets. Such shared information may include soft information (e.g., probabilistic output from the decoder, such as LLRs calculated in a decoding iteration) that may help in decoding and/or may include definitively decoded bits (also referred to as hard information).

Figure 12B:
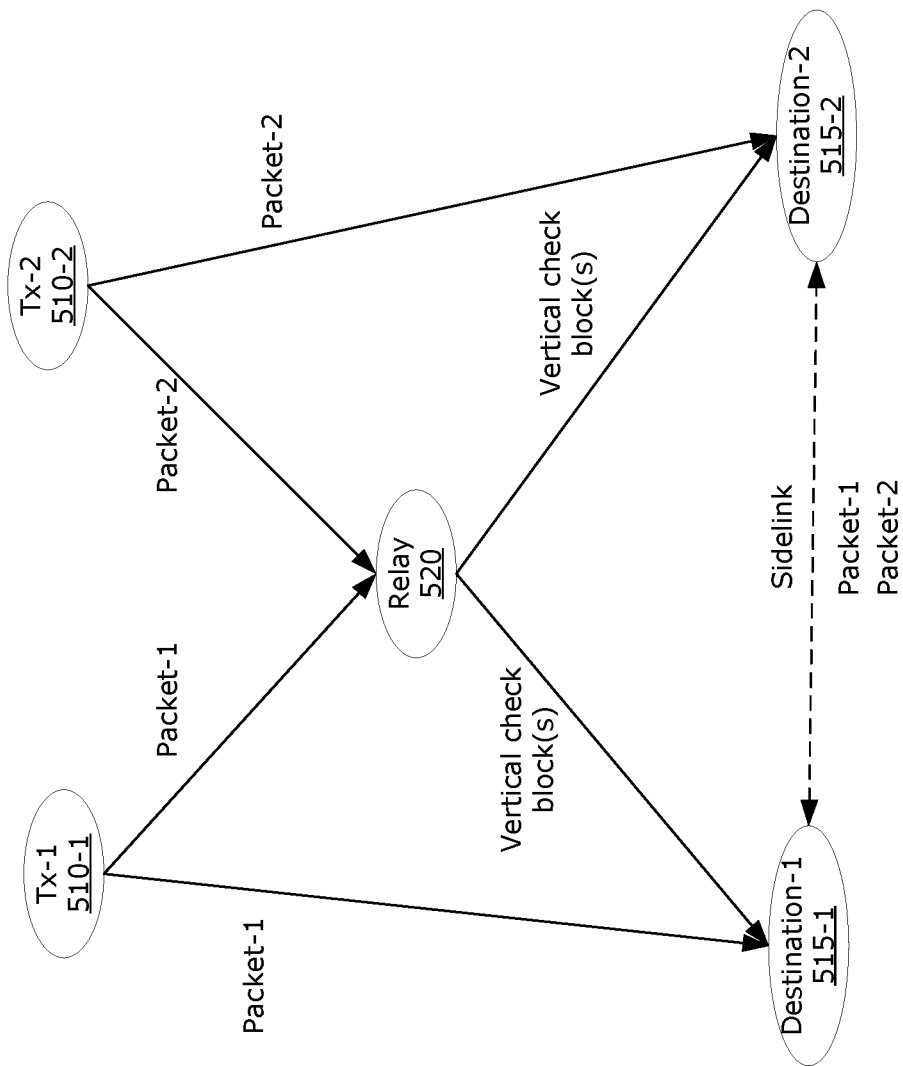

FIG. 12B illustrates another example of joint HARQ, which may be considered a variation of FIG. 12A. In this variation, the sources 505 are replaced with transmitters 510 (which may be network nodes, equivalent to the sources 505; or may be antennas or transmitter chains of the same source, among other possibilities). Instead of 2D joint coding being performed at one (or more) transmitter 510, each transmitter 510 transmits its respective packet to the relay 520 (in addition to transmitting packet to a respective destination 515), and the relay 520 performs joint coding using the packets received from the transmitters 510.

Although FIGS. 12A and 12B show examples with one relay 520 and one hop, it should be understood that these examples may be modified to include more than one relay 520 and more than one hop. In general, FIGS. 12A and 12B illustrate examples of joint HARQ in a one (or more) hop relay transmission scheme. Each destination receives at least an intended packet from a source and at least one set of vertical check block(s) from at least one relay. Two or more destinations share information (e.g., soft information and/or hard information, and/or the other packet(s) involved in the 2D joint coding) over a SL interface, to enable each destination to decode and recover its intended packet. The vertical check block(s) may be generated by joint coding at one or more sources 505 and/or by one or more relays 520.

Figure 13A:
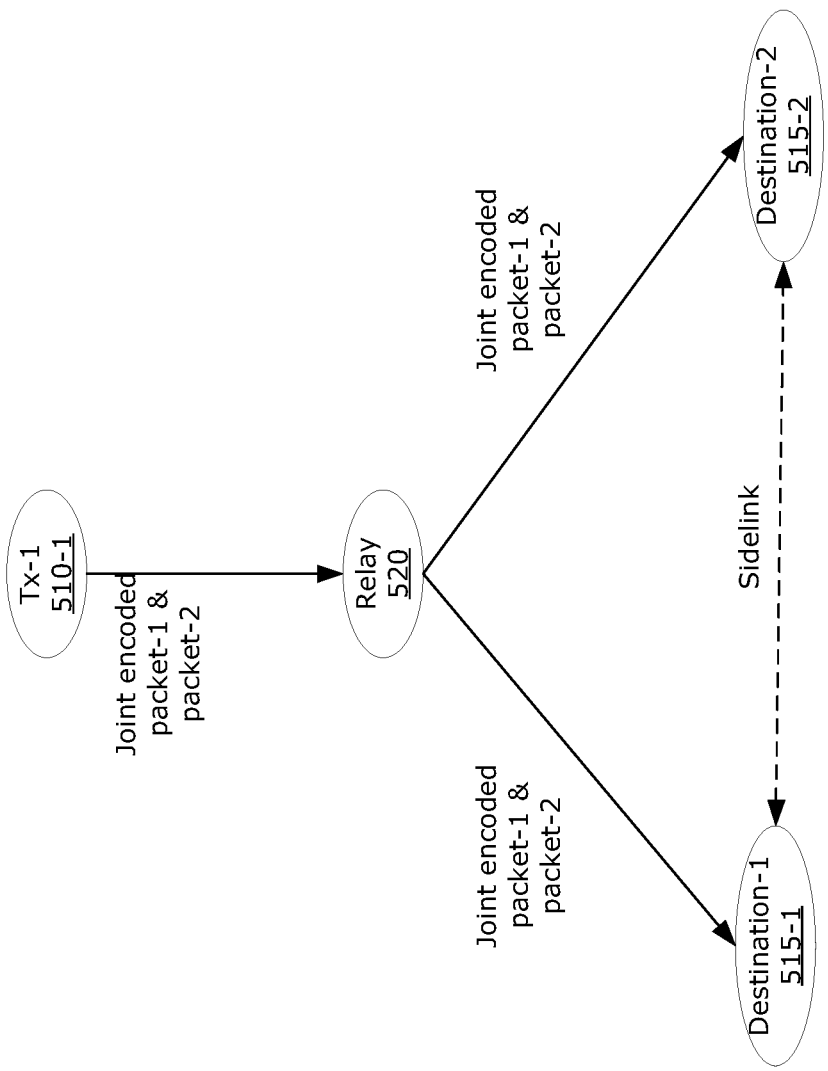
FIGS. 13A and 13B illustrate examples of cooperative HARQ.

FIG. 13A illustrates an example of cooperative HARQ between EDs, with the use of vertical check blocks. In this example, cooperation between EDs involves the sharing of information between EDs to assist in decoding of packets.

In FIG. 13A, a transmitter 510 (which may also be a source 505, such as a network node (e.g., the BS 170)) transmits packets intended for different destinations 515 (e.g., EDs 110). In this example, packet-1 is intended to be received by destination-1 515-1 and packet-2 is intended to be received by destination-2 515-2. The transmitter 510 performs joint encoding of packet-1 and packet-2. Joint encoding in the present disclosure means that cross-packet vertical check block(s) are generated based on two (or more) packets, and both (or more) packets are transmitted together with the generated vertical check block(s).

The joint encoded packet-1 and packet-2 (including the generated vertical check block(s)) are transmitted to the relay 520, which in turn transmits the joint encoded packet-1 and packet-2 to each destination 515. The destinations 515 assist each other in decoding the packets by sharing information over a SL interface. The information shared over the SL interface may include successfully decoded bits/ packet(s) and/or soft information outputted by the decoder (e.g., LLRs generated in each iteration of decoding).

Figure 13B:
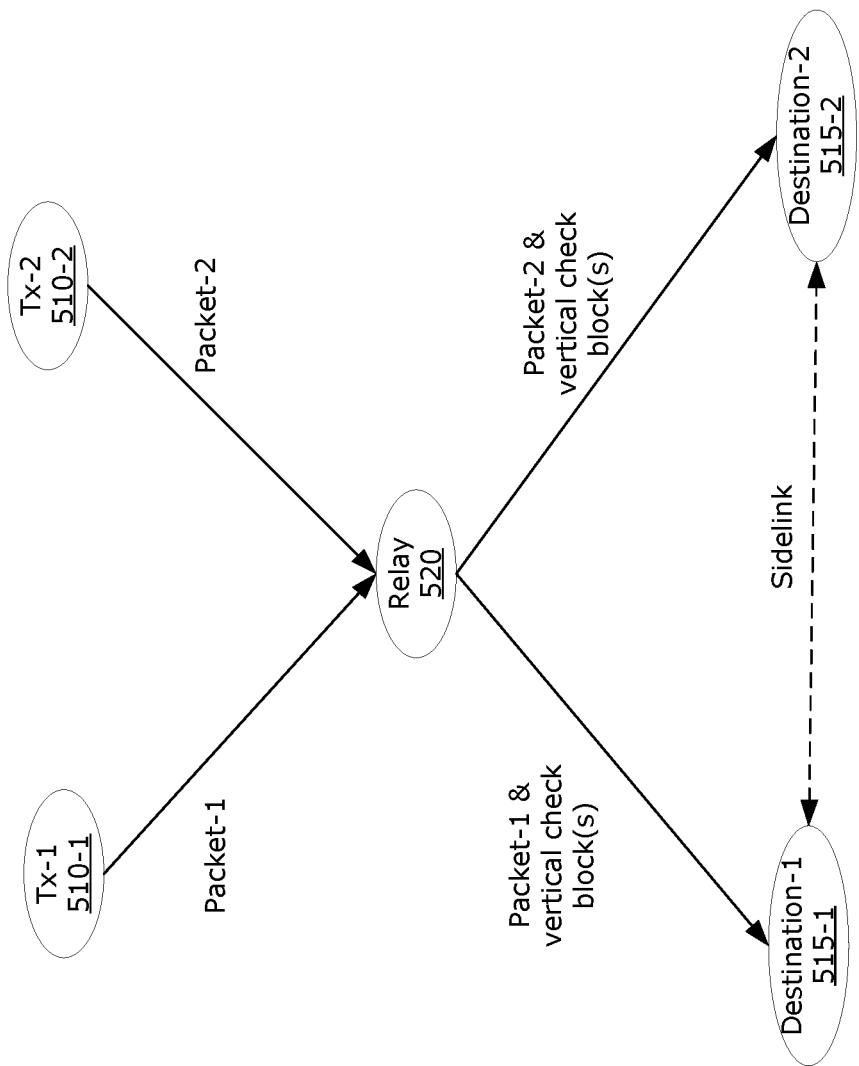

FIG. 13B illustrates another example of cooperative HARQ. In this example, packet-1 and packet-2 originate from different transmitters 510 (Tx-1 510-1 and Tx-2 510-2 in this example). The transmitters 510 in this example do not share packets with each other. Each transmitter 510 transmits its originating packet to the relay 520. After receiving both packets, the relay 520 performs joint coding to generate vertical check block(s) based on packet-1 and packet-2. The relay 520 then transmits packet-1 and vertical check block(s) to destination-1 515-1, and transmits packet-2 and vertical check block(s) to destination-2 515-2. The destinations 515 assist each other in decoding the packets by sharing information over a SL interface. The information shared over the SL interface may include successfully decoded packet(s) and/or soft information outputted by the decoder (e.g., LLRs generated in each iteration of decoding).

FIGS. 13A and 13B illustrate examples of HARQ transmission schemes in which EDs 110 use SL communications to assist each other in decoding. The transmission schemes may be used for the initial transmission as well as retransmissions in HARQ.

In general, packet-1 and packet-2 may be the same or may be different. Examples in which packet-1 and packet-2 carry the same data may be the case where the source 505 is multicasting the same data packet to the EDs 110 (the multicasted data packet may be intended for only one ED 110, or intended for all EDs 110 in the multicast group, for example). In some examples, packet-1 and packet-2 may be intended for different EDs 110 (as shown in FIGS. 13A and 13B) or for the same ED 110. In examples where the packets are intended for one ED 110, other non-intended EDs 110 may still receive packet(s) and vertical check block(s) and serve to assist the intended ED 110 in decoding the packet(s).

In order for a receiving device to properly make use of vertical (and horizontal) check blocks for decoding, the receiving device should have information about how the vertical (and horizontal) check blocks were generated. Information about how 2D joint coding was performed may be signaled by the network (e.g., the BS 170) to the decoding nodes (e.g., EDs 110). In the case of DL transmission, 2D joint coding information may be signaled by a transmitting device (e.g., the BS 170) to a receiving device (e.g., the ED 110) prior to, during, or immediately following the arrival of joint encoded data at the receiving device. In the case of UL transmission, the transmitting device (e.g., the ED 110) may have been preconfigured for 2D joint coding (e.g., by configuration signals from the BS 170 ahead of time).

Some joint coding information that may be signaled include: joint coding partition, horizontal code block coding rate, vertical code block coding rate, and interleaver, among other possibilities.

Information about joint coding partition may include information about how input bits are defined into respective horizontal and vertical code blocks. Joint coding partition information may define the number of horizontal and/or vertical code blocks. Defining the number of horizontal and/or vertical code blocks may indirectly define how the input bits are partitioned into horizontal and vertical code blocks, based on an assumption (or standards-based definition) that the input bits are partitioned into equally-sized horizontal code blocks and equally-sized vertical code blocks. The information about joint coding partition may also include information defining the unequally-sized code blocks (including the possibility that a given vertical code block is generated using different numbers of bits from each horizontal code blocks).

Signaling may indicate the same coding rate to be used for horizontal code blocks and vertical code blocks, in which case it may not be necessary to separately signal information about the horizontal code block coding rate and the vertical code block coding rate. In some examples, if different coding rates are used for horizontal coding and vertical coding, then the coding rate for horizontal coding and the coding rate for vertical coding may each be indicated in signaling.

Information about interleaver(s) used for generating vertical check block(s) may be transmitted in the form of a seed (or index) of one or more interleavers in a preconfigured and known (e.g., standards-defined) set of available interleavers.

Any of the information described above, instead of being signaled, may be predefined, preconfigured, semi-statically configured (e.g., using radio resource control (RRC) signaling) or dynamically indicated (e.g., in downlink control information (DCI) transmissions). For example, any of the joint coding information may be predefined in a standard and/or preconfigured in network systems/devices, thus being known to both transmitting and receiving devices. In some examples, different options or parameter values for joint coding may be defined by standards, and signaling (e.g., RRC or DCI) may be used to indicate (e.g., by referencing an index value) the particular option or parameter value to use.

Different types of signaling (e.g., RRC or DCI) may be used to indicate shorter term changes (e.g., selecting a particular interleaver to use) and longer term changes (e.g., changing the partitioning of vertical code blocks).

Figure 14:
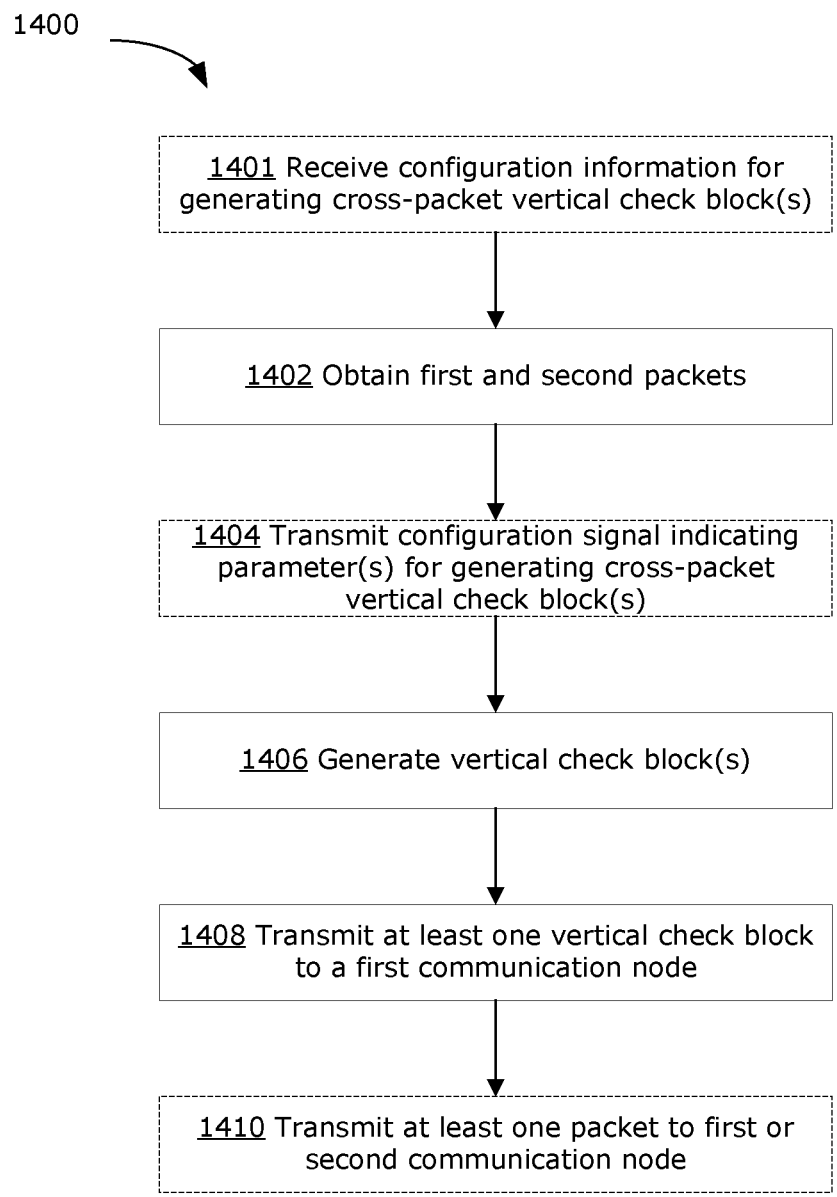
FIG. 14 is a flowchart of an example method for generating and transmitting vertical check blocks.

FIG. 14 is a flowchart illustrating an example method 1400 that may be performed by a network node for generating and transmitting vertical check block(s). The method 1400 may be used in any of the examples described herein, for example by a source 505 (e.g., a BS 170 in the case of DL transmissions, or an ED 110 in the case of UL transmissions or SL transmissions), by a transmitter 520, by a relay 520, or by a cooperating destination 515 (e.g., an ED 110 in the case of DL transmissions or SL transmissions, or a BS 170 in the case of UL transmissions).

Optionally, at 1401, configuration information for generating cross-packet vertical check blocks may be received (e.g., via configuration signaling, such as RRC signaling or DCI transmission). The configuration information includes one or more parameters for generating the cross-packet vertical check block(s). For example, step 1401 may be performed by an ED 110 acting as the source 505 for a UL or SL transmission. In such cases, the ED 110 may receive the configuration information, for example from a BS 170 (or other uplink node, such as a relay node) or from another ED (or other SL node), so that the ED 110 is able to generate cross-packet vertical check block(s). The configuration information received at 1401 may include information about code block partitioning, selection of interleaver, coding rate, and/or other information related to configuration of jointly coded code blocks, as discussed previously. The configuration information may be received prior to or at the start of the method 1400 (e.g., at the time the ED 110 first associates with the BS 170), or any time during the method 1400 before generation of vertical check block(s).

In some examples, step 1401 may not be required. For example, the method 1400 may be performed by the BS 170 acting as the source 505 for a DL transmission. Or the configuration information may be predetermined (e.g., defined in a standard) and does not need to be communicated from the BS 170 to the ED 110.

At 1402, at least first and second packets are obtained (more than two packets may be obtained, for simplicity only first and second packets will be referred to). The first and second packets may be obtained in various ways, as discussed in examples disclosed herein.

For example: One or both of the first and second packets may be obtained internally (e.g., generated internally). One or both of the first and second packets may be received from another network node (e.g., received from an UL transmission, DL transmission, SL transmission or backhaul transmission). If both packets are received from another network node, both packets may be received from the same network node, or from different network nodes. The first and second packets may be received in the same transmission or in two separate transmissions (which may have been transmitted at the same time or at different times).

Optionally, at 1404, a configuration signal (e.g., RRC signaling or DCI transmission) may be transmitted to intended destination(s) of the first and/or second packet, to indicate parameter(s) used for generating cross-packet vertical check block(s). For example, step 1404 may be performed by the BS 170 acting as the source 505 for a DL transmission, to enable the intended destination ED 110 to be able to properly decode the transmission. Step 1404 may be performed prior to step 1402, or at a later time in the method 1400, or following method 1400.

At 1406, a set of one or more cross-packet vertical check block(s) is generated (e.g., using parameter(s) indicated at optional step 1404). Each vertical check block is generated using a set of cross-packet bits, which includes at least one bit from each of the first and second packets.

In some examples, more than one set of cross-packet vertical check block(s) may be generated for the first and second packets. Different sets of cross-packet vertical check block(s) may be generated for the first and second packets using different parameters (e.g., using different interleavers).

At 1408, at least one generated cross-packet vertical check block is transmitted to a first network node. The first network node may be an intended destination 515 of the first and/or second packet, may be a relay 520, may be a cooperating source 505, or may be a cooperating destination 515, for example.

Optionally, at 1410, one or both of the first and second packet is transmitted to the first network node (same as the first network node of step 1408) or to a different second network node. The second network node may be an intended destination 515 of the first and/or second packet, may be a relay 520, may be a cooperating source 505, or may be a cooperating destination 515, for example. If the first and/or second packet is transmitted to the first network node, the first and/or second packet may be transmitted in the same transmission as the associated vertical check block(s).

In some examples, step 1406 and optional step 1410 may be performed at the same transmission opportunity (e.g., in a one-shot transmission), or the vertical check block(s) may be transmitted in a retransmission (following transmission of the first and/or second packet).

It should be understood that the steps of the method 1400 may be performed in a different order than that shown, and may be adapted to any of the examples disclosed herein.

Figure 15:
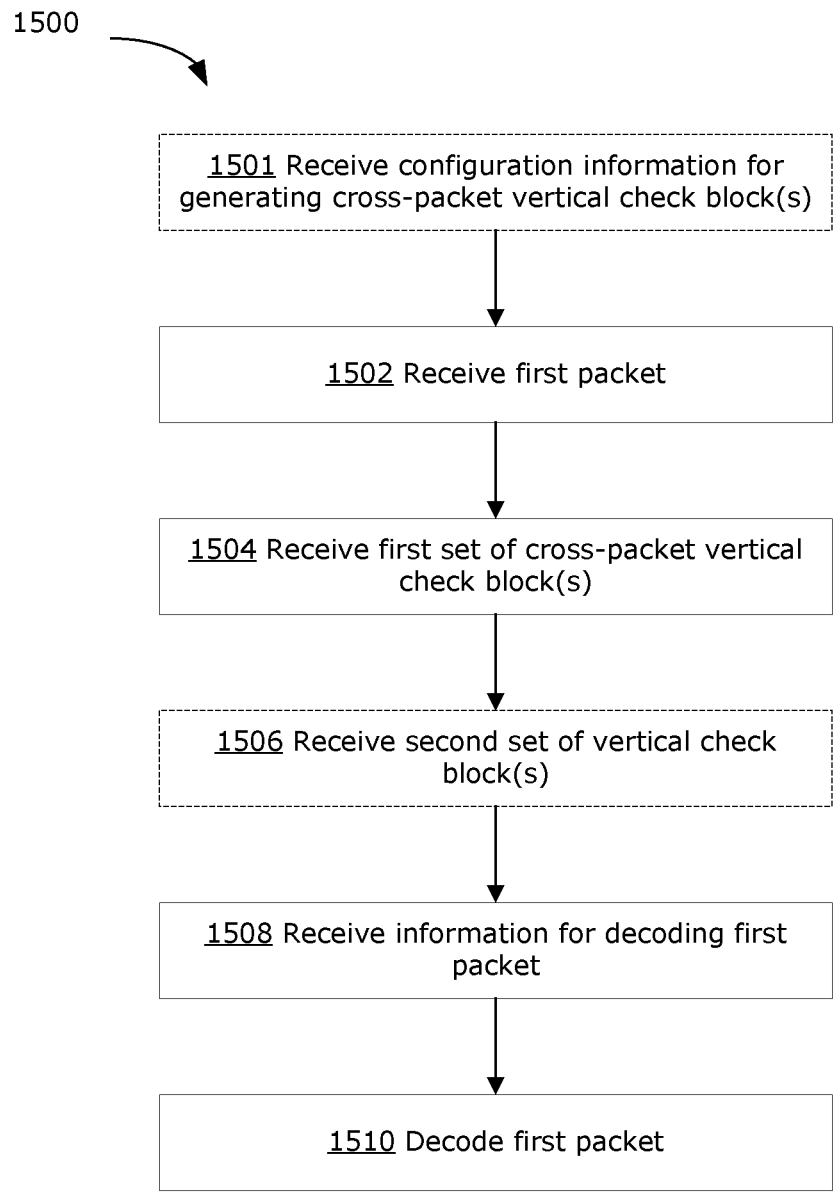
FIG. 15 is a flowchart of an example method for decoding a received packet using vertical check blocks.

FIG. 15 is a flowchart illustrating an example method 1500 that may be performed by a network node (e.g., a terminal device such as an ED 110 or a network-side device such as a BS 170) for receiving and decoding a packet using vertical check block(s). The method 1500 may be used in any of the examples described herein, for example by an intended destination 515 (e.g., an ED 110 in the case of DL transmissions or SL transmissions, or a BS 170 in the case of UL transmissions), or by a cooperating destination 515

(e.g., an ED 110 in the case of DL transmissions or SL transmissions, or a BS 170 in the case of UL transmissions).

Optionally, at 1501, configuration information for generating cross-packet vertical check blocks may be received (e.g., via configuration signaling, such as RRC signaling or DCI transmission). The configuration information includes one or more parameters that was used for generating the cross-packet vertical check block(s), and that may be used for decoding a jointly coded transmission. For example, step 1501 may be performed by an ED 110 acting as the destination 515 for a DL (or SL) transmission. In such cases, the ED 110 may receive the configuration information, for example from a BS 170 (or other uplink node, such as a relay node) or from another ED (or other SL node), so that the ED 110 is able to decode jointly coded packets with cross-packet vertical check block(s). The configuration information received at 1501 may include information about code block partitioning, selection of interleaver, coding rate, and/or other information related to configuration of jointly coded code blocks, as discussed previously. The configuration information may be received prior to or at the start of the method 1500 (e.g., at the time the ED 110 first associates with the BS 170), or any time during the method 1500 before decoding.

In some examples, step 1501 may not be required. For example, the method 1500 may be performed by the BS 170 acting as the destination for a UL transmission. Or the configuration information may be predetermined (e.g., defined in a standard) and does not need to be communicated from the BS 170 to the ED 110.

At 1502, at a first packet is received from a network node. The packet may be received from an UL transmission, DL transmission, SL transmission or backhaul transmission, for example. The packet may be received from a source 505 (e.g., a BS 170 in the case of DL transmissions, or an ED 110 in the case of SL transmissions or UL transmission), a relay 520 or a cooperating destination 515.

At 1504, a first set of one or more cross-packet vertical check block(s) is received. The cross-packet vertical check block(s) in the first set were generated based on a first set of cross-packet bits, which include at least one bit from each of the first packet and at least a second packet. The first set of cross-packet vertical check block(s) may be received from the same network node as step 1502, or a different network node.

The first packet and the first set of cross-packet vertical check block(s) may be received in various ways, as discussed in examples disclosed herein.

For example: Both the first packet and the first set of cross-packet vertical check block(s) may be received from the same network node, or from different network nodes. If received from the same network node, the first packet and the first set of cross-packet vertical check block(s) may be received in the same transmission, or in two separate transmissions (e.g., first packet received in a first transmission, and the first set of cross-packet vertical check block(s) received in a retransmission). If received from different network nodes, the first packet and the first set of cross-packet vertical check block(s) may be received at the same time or at different times.

Optionally, at 1506, a second set of one or more cross-packet vertical check block(s) is received. The cross-packet vertical check block(s) in the second set may be generated based on a second set of cross-packet bits (e.g., using a different interleaver than the generation of the first set of cross-packet vertical check block(s)), which include at least one bit from each of the first packet and at least a second packet. The second set of cross-packet vertical check block(s) may be received from the same network node as step 1502, the same network node as step 1504, or a different network node.

At 1508, information for decoding the first packet is received. This information may be the second packet, decoded data from the second packet, or soft information (e.g., probabilistic data) from a decoding attempt. This information may be received from the same network node as step 1502, the same network node as step 1504, the same network node as optional step 1506, or a different network node.

At 1510, the first packet is decoded, with the first set of cross-packet vertical check block(s) (and also the second set of cross-packet vertical check block(s), if received) being used to help with decoding (e.g., using soft output from attempts to decode the vertical check block(s), as discussed above).

Configuration information about how the vertical check block(s) were generated may be used in the decoding. Such configuration information may be preconfigured or predefined, or may be received from prior signaling (e.g., RRC signaling or DCI transmission).

Soft information that may be generated during decoding attempts may be shared with other network nodes, for cooperative decoding.

It should be understood that the steps of the method 1500 may be performed in a different order than that shown, and may be adapted to any of the examples disclosed herein.

Although examples described above are in the context of joint coding to generate vertical check block(s) across two packets, it should be understood that similar operations may be used for 2D joint coding across more than two packets (with commensurate increase in possibilities for different transmission schemes). In general, any elements shown or discussed in plurality may extend to any plurality.

It should be understood that examples described in the context of joint coding across packets may also be applicable in the context of joint coding across TBs.

The present disclosure makes reference to vertical check blocks. It should be understood that vertical check blocks may also be referred to as cross-packet check blocks, cross-TB check blocks, or cross-code block check blocks, among other possibilities. Further, check blocks may be equally referred to as parity blocks, or redundancy blocks, among other possibilities.

The present disclosure makes reference to 2D joint coding. In some instances, 2D joint coding may also be referred to as cross-codebook coding, horizontal plus vertical coding, vertical coding, or inter-codebook coding, among other possibilities.

The present disclosure may be applicable to systematic code (e.g., LPDC code, or Turbo code) as well as non-systematic code (e.g., Polar code, block code, or convolutional code).

Examples described herein may help to provide lower latency and/or higher reliability in wireless communications. Examples described herein may help to improve performance (e.g., better efficiency, fewer retransmissions) for HARQ retransmissions. For example, additional coding gain may be achieved during retransmissions, such that fewer retransmissions are required to meet a reliability requirement.

Some examples may enable implementation of one-shot URLLC, which may be useful for extreme low latency and/or high reliability applications.

Some examples may be implemented for joint HARQ and/or cooperative HARQ applications.

The present disclosure describes examples that enable UE-cooperative URLLC, which may be useful for UL latency reduction and/or reliability enhancement. The disclosed examples may be applicable for multi-link (or multi-node) communications, single-hop communications (i.e., where there is one intermediate node along the communication path between a transmitting node and a receiving node), multi-hop communications (i.e., where there are multiple intermediate nodes along the communication path between a transmitting node and a receiving node), and multi-UE cooperative communications, among other possibilities.

The present disclosure describes examples that may enable PHY layer network coding, based on 2D joint coding. Examples described herein may use PHY layer network coding, to enable distributed, multi-path data transmissions.

Various example transmission schemes have been described, which may include the use of a relay (e.g., a network node in the role of a relay, or a UE in the role of a relay), may include single hop or multi-hop transmission paths (and which may be applied to mesh networks). The example transmission schemes may include multi-source to multi-destination transmissions, single source to multi-destination transmissions, single source to single destination transmissions, or multi-source to single destination transmissions. The example transmissions schemes may also include multi-packet transmissions (e.g., transmission of multiple packets in a transmission from a single source to a single destination).

Examples described herein may enable the use of SL communications (between relay nodes or between destination nodes) for sharing of data. SL communications may help to improve accuracy and/or efficiency of decoding, for example.

Examples that have been described as UL communications to the BS may be adapted for communications in which the destination of the communications is another ED, or another entity in the wireless system other than the BS. The source of UL communications may be an ED (e.g., a UE), or another entity in the wireless system. Similarly, examples that have been described as DL communications originating from the BS may be adapted for communications in which the origin of the communications is another entity in the wireless system, other than the BS. The destination of DL communications may be an ED (e.g., a UE), or another entity in the wireless system.

Examples that have been described as involving cooperation over a SL interface between UEs (e.g., to assist in UL transmissions or to assist in decoding DL transmissions) may be adapted for cooperation between BSs over a backhaul interface (e.g., to assist in DL transmissions or to assist in decoding UL transmissions). Similarly, examples that have been described as involving cooperation over a backhaul interface between BSs (e.g., to assist in DL transmissions or to assist in decoding UL transmissions) may be adapted for cooperation between UEs over a SL interface (e.g., to assist in UL transmissions or to assist in decoding DL transmissions).

The present disclosure describes, in an example 1, a method, comprising: obtaining a first packet and a second packet; generating a set of one or more cross-packet check blocks, each cross-packet check block being generated based on a set of cross-packet bits including at least one bit from each of the first and second packets; and transmitting at least one cross-packet check block to a first communication node.

The present disclosure describes, in an example 2, the method of example 1 further comprising: transmitting at least one of the first and second packets to a second communication node.

The present disclosure describes, in an example 3, the method of example 2 wherein the second communication node is an intended destination node for the at least one of the first and second packets.

The present disclosure describes, in an example 4, the method of example 1, further comprising: transmitting at least one of the first and second packets to the first communication node.

The present disclosure describes, in an example 5, the method of any one of examples 2 to 4, wherein the at least one of the first and second packets and the at least one cross-packet check block are transmitted during the same transmission opportunity.

The present disclosure describes, in an example 6, the method of any one of examples 2 to 4, wherein the at least one of the first and second packets is transmitted over a sidelink interface.

The present disclosure describes, in an example 7, the method of any one of examples 2 to 4, wherein the at least one of the first and second packets is transmitted over a backhaul interface.

The present disclosure describes, in an example 8, the method of any one of examples 1 to 7, wherein the at least one cross-packet check block is transmitted over a sidelink interface.

The present disclosure describes, in an example 9, the method of any one of examples 1 to 8, wherein the at least one cross-packet check block is transmitted over a backhaul interface.

The present disclosure describes, in an example 10, the method of any one of examples 1 to 9, wherein obtaining the first and second packets comprises receiving at least one of the first and second packets from a third communication node.

The present disclosure describes, in an example 11, the method of example 10, wherein the at least one of the first and second packets is received over a sidelink interface.

The present disclosure describes, in an example 12, the method of example 10, wherein the at least one of the first and second packets is received over a backhaul interface.

The present disclosure describes, in an example 13, the method of any one of examples 1 to 12, wherein the first communication node is an intended destination node of at least one of the first and second packets.

The present disclosure describes, in an example 14, the method of any one of examples 1 to 13, wherein the method is performed at a base station.

The present disclosure describes, in an example 15, the method of any one of examples 1 to 13, wherein the method is performed at a relay node.

The present disclosure describes, in an example 16, the method of any one of examples 1 to 13, wherein the method is performed at a user equipment device.

The present disclosure describes, in an example 17, the method of any one of examples 1 to 16, further comprising: transmitting a configuration signal to an intended destination node of at least one of the first and second packets, the configuration signal including information about one or more parameters used in generating the set of one or more cross-packet check blocks.

The present disclosure describes, in an example 18, the method of any one of examples 1 to 16, further comprising: receiving a configuration signal, the configuration signal including information about one or more parameters to be used in generating the set of one or more cross-packet check blocks.

The present disclosure describes, in an example 19, the method of any one of examples 1 to 18, wherein the set of cross-packet bits for generating the set of one or more cross-packet check blocks is selected according to a predefined interleaver.

The present disclosure describes, in an example 20, the method of example 19, further comprising: generating another set of cross-packet check blocks based on another set of cross-packet bits, the other set of cross-packet bits being selected according to another predefined interleaver.

The present disclosure describes, in an example 21, a method comprising: receiving a first packet from a first communication node; receiving, from the first communication node or a second communication node, a first set of one or more cross-packet check blocks, each cross-packet check block in the first set being generated based on a first set of cross-packet bits including at least one bit from each of the first packet and at least a second packet; receiving, from the first or second communication node or a third communication node, information for decoding the first packet; and decoding the first packet, wherein the first set of one or more cross-packet check blocks is used during the decoding.

The present disclosure describes, in an example 22, the method of example 21, wherein the information about the at least second packet is received over a sidelink interface.

The present disclosure describes, in an example 23, the method of example 21 or 22, wherein the information for decoding the first packet includes decoded data from the at least second packet.

The present disclosure describes, in an example 24, the method of example 21 or 22, wherein the information for decoding the first packet includes probabilistic data from a decoding attempt at the first, second or third communication node.

The present disclosure describes, in an example 25, the method of any one of examples 21 to 24, further comprising: receiving, from the first, second, third, or fourth communication node, a second set of one or more cross-packet check blocks, each cross-packet check block in the second set being generated based on a second set of cross-packet bits including at least one bit from each of the first packet and at least a second packet; wherein the second set of one or more cross-packet check blocks is also used during the decoding.

The present disclosure describes, in an example 26, the method of any one of examples 21 to 25, further comprising: receiving a configuration signal, the configuration signal including information about one or more parameters used in generating at least the first set of one or more cross-packet check blocks.

The present disclosure describes, in an example 27, an apparatus comprising a processing unit, the processing unit being configured to execute machine-readable instructions to cause the apparatus to perform the method of any one of examples 1 to 20.

The present disclosure describes, in an example 28, the apparatus of example 27, wherein the apparatus is a base station.

The present disclosure describes, in an example 29, the apparatus of example 27, wherein the apparatus is a user equipment.

The present disclosure describes, in an example 30, the apparatus of example 27, wherein the apparatus is a relay node.

The present disclosure describes, in an example 31, an apparatus comprising a processing unit, the processing unit being configured to execute machine-readable instructions to cause the apparatus to perform the method of any one of examples 21 to 26.

The present disclosure describes, in an example 32, the apparatus of example 31, wherein the apparatus is a base station.

The present disclosure describes, in an example 33, the apparatus of example 31, wherein the apparatus is a user equipment.

The present disclosure describes, in an example 34, a computer readable medium having machine-executable instructions stored thereon, wherein the instructions, when executed by a processing unit of an apparatus, cause the apparatus to perform the method of any one of examples 1 to 20.

The present disclosure describes, in an example 35, a computer readable medium having machine-executable instructions stored thereon, wherein the instructions, when executed by a processing unit of an apparatus, cause the apparatus to perform the method of any one of examples 21 to 26.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method at a first communication node, the method comprising:
   obtaining a first packet to be transmitted over a network and a second packet to be transmitted over the network;
   generating a set of one or more error-correcting code blocks using an error correction code, the set of one or more error-correcting code blocks including a set of one or more cross-packet check blocks, each cross-packet check block being generated, using the error correction code, based on a set of cross-packet bits including at least one bit from each of the first and second packets;
   transmitting at least one cross-packet check block to a second communication node; and
   transmitting at least one of the first and second packets over the network to the second communication node or a third communication node, wherein the at least one of the first and second packets is encoded to include a respective at least one of a first packet-specific check block or a second packet-specific check block, the first packet-specific check block being generated using a same or different error correction code from bits of the first packet and the second packet-specific check block being generated using the same or different error correction code from bits of the second packet.

2. The method of claim 1, wherein at least one of the first communication node, the second communication node, or the third communication node is an intermediate node between a source node of at least one of the first and second packets and the destination node of at least one of the first and second packets.

3. The method of claim 1, wherein the at least one cross-packet check block and the at least one of the first and second packets are transmitted to the second communication node.

4. The method of claim 1, wherein the at least one cross-packet check block is transmitted to the second communication node and the at least one of the first and second packets is transmitted to the third communication node.

5. The method of claim 1, wherein the first communication node is a first intermediate node and the second or the third communication node is a second intermediate node, wherein the first and the second intermediate nodes are along a communication path between the source node and the destination node.

6. The method of claim 1, wherein the first communication node is a first intermediate node and the second communication node is a second intermediate node, and wherein the at least one cross-packet check block is transmitted over a sidelink interface.

7. The method of claim 1, wherein the first communication node is a first intermediate node, and wherein at least one of the first and second packets is transmitted over a sidelink interface to the second or third communication node that is another intermediate node.

8. The method of claim 1, wherein the first communication node is the source node of at least one of the first packet and the second packet, and the second or third communication node is the intermediate node.

9. The method of claim 1, wherein the first communication node is the intermediate node, and the second or third communication node is the destination node.

10. A method at a first communication node, the method comprising:
    receiving a first packet, transmitted over a network, from a second communication node, the first packet being encoded to include a first packet-specific check block generated using an error correction code from bits of the first packet;
    receiving, from the second communication node or a third communication node, information for decoding the first packet;
    receiving, from the second communication node, the third communication node or a fourth communication node, a set of one or more error-correcting code blocks including a first set of one or more cross-packet check blocks, each cross-packet check block in the first set being generated, using a same or different error correction code, based on a first set of cross-packet bits including at least one bit from each of the first packet and at least a second packet; and
    decoding the first packet, wherein the first set of one or more cross-packet check blocks is used during the decoding.

11. The method of claim 10, wherein at least one of the first communication node, the second communication node, or the third communication node is an intermediate node between a source node of the first packet and a destination node of the first packet.

12. The method of claim 10, wherein the first communication node is the intermediate node, the method further comprising:
    transmitting the decoded first packet to the destination node.

13. The method of claim 10, wherein the first packet and the first set of one or more cross-packet check blocks are received in different time slots or a same time slot.

14. The method of claim 10, wherein the first packet, the first set of one or more cross-packet check blocks, or the information for decoding the first packet is received over a sidelink interface.

15. An apparatus at a first communication node, the apparatus comprising:
    a processing unit; and
    a non-transitory memory including instructions that, when executed by the processing unit, cause the apparatus to:
    obtain a first packet to be transmitted over a network and a second packet to be transmitted over the network;
    generate a set of one or more error-correcting code blocks using an error correction code, the set of error-correcting code blocks including a set of one or more cross-packet check blocks, each cross-packet check block being generated, using the error correction code, based on a set of cross-packet bits including at least one bit from each of the first and second packets;
    transmit at least one cross-packet check block to a second communication node; and
    transmit at least one of the first and second packets over the network to the second communication node or a third communication node, wherein the at least one of the first and second packets is encoded to include a respective at least one of a first packet-specific check block or a second packet-specific check block, the first packet-specific check block being generated using a same or different error correction code from bits of the first packet and the second packet-specific check block being generated using the same or different error correction code from bits of the second packet.

16. The apparatus of claim 15, wherein at least one of the first communication node, the second communication node, or the third communication node is an intermediate node between a source node of at least one of the first and second packets and the destination node of at least one of the first and second packets.

17. The apparatus of claim 15, wherein the at least one cross-packet check block and the at least one of the first and second packets are transmitted to the second communication node.

18. The apparatus of claim 15, wherein the at least one cross-packet check block is transmitted to the second communication node and the at least one of the first and second packets is transmitted to the third communication node.

19. An apparatus at a first communication node, the apparatus comprising:
a processing unit; and
a non-transitory memory including instructions that, when executed by the processing unit, cause the apparatus to:
receive a first packet, transmitted over a network, from a second communication node, the first packet being encoded to include a first packet-specific check block generated using an error correction code from bits of the first packet;

receive, from the second communication node or a third communication node, information for decoding the first packet;

receive, from the second communication node, the third communication node or a fourth communication node, a set of one or more error-correcting code blocks including a first set of one or more cross-packet check blocks, each cross-packet check block in the first set being generated, using a same or different error correction code, based on a first set of cross-packet bits including at least one bit from each of the first packet and at least a second packet; and decode the first packet, wherein the first set of one or more cross-packet check blocks is used during the decoding.

20. The apparatus of claim 19, wherein at least one of the first communication node, the second communication node, or the third communication node is an intermediate node between a source node of the first packet and a destination node of the first packet.

21. The method of claim 1, wherein the error correction code and the same or different error correction code include a low density parity check (LDPC) code or a Turbo code.

* * * * *